United States Patent
Ishihara et al.

(10) Patent No.: US 9,999,079 B2
(45) Date of Patent: Jun. 12, 2018

(54) COMMUNICATION DEVICE, COMMUNICATION CONTROL METHOD, AND NON-TRANSITORY COMPUTER READABLE MEDIUM

(71) Applicant: KABUSHIKI KAISHA TOSHIBA, Tokyo (JP)

(72) Inventors: Takeshi Ishihara, Kanagawa (JP); Masahiro Ishiyama, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 265 days.

(21) Appl. No.: 14/855,721

(22) Filed: Sep. 16, 2015

(65) Prior Publication Data
US 2016/0088663 A1 Mar. 24, 2016

(30) Foreign Application Priority Data
Sep. 19, 2014 (JP) .................... 2014-191687

(51) Int. Cl.
*H04L 12/26* (2006.01)
*H04W 76/02* (2009.01)
*H04W 84/12* (2009.01)

(52) U.S. Cl.
CPC ......... *H04W 76/022* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,289,506 B1* | 10/2007 | Hannuksela | ... | H04N 21/234327 370/394 |
| 8,599,786 B2* | 12/2013 | Backlund | .......... | H04W 36/0016 370/331 |

(Continued)

FOREIGN PATENT DOCUMENTS

| JP | H11-331947 | 11/1999 |
|---|---|---|
| JP | 2004-179762 | 6/2004 |

(Continued)

OTHER PUBLICATIONS

Enlish-language machine translation of JPH11-331947.
(Continued)

*Primary Examiner* — Chi H Pham
*Assistant Examiner* — Fahmida Chowdhury
(74) *Attorney, Agent, or Firm* — Nixon & Vanderhye, P.C.

(57) ABSTRACT

According to one embodiment, a communication device includes a first circuitry, a second circuitry and a third circuitry. The first circuitry establishes a wireless connection with a first communication device, in accordance with a communication request relating to data communication. The second circuitry measures a communication environment of the communication device to acquire communication environment data. The third circuitry establishes a logical connection with a second communication device relating to the communication request via the wireless connection and controls so as to perform the data communication with the second communication device in accordance with the communication environment data.

16 Claims, 24 Drawing Sheets

(56) References Cited

U.S. PATENT DOCUMENTS

| | | | |
|---|---|---|---|
| 2008/0089272 A1* | 4/2008 | Ahokangas | H04W 48/18 370/328 |
| 2010/0232438 A1* | 9/2010 | Bajpai | H04L 69/16 370/400 |
| 2011/0125915 A1 | 5/2011 | Takei et al. | |
| 2013/0033997 A1 | 2/2013 | Cheng | |
| 2014/0092745 A1* | 4/2014 | Hui | H04W 28/12 370/236 |
| 2014/0274115 A1* | 9/2014 | Michalson | H04W 4/028 455/456.1 |
| 2015/0382215 A1* | 12/2015 | Huang | H04W 24/08 370/252 |
| 2016/0007405 A1 | 1/2016 | Ishihara et al. | |

FOREIGN PATENT DOCUMENTS

| | | |
|---|---|---|
| JP | 2009-105487 | 5/2009 |
| JP | 2010-035033 | 2/2010 |
| JP | 2016-019101 | 2/2016 |

OTHER PUBLICATIONS

Enlish-language machine translation of JP2004-179762.
Enlish-language machine translation of JP2009-105487.
Enlish-language machine translation of WO2014/034002.
Ishihara et al., U.S. Appl. No. 14/755,158, filed Jun. 30, 2015.

* cited by examiner

301

| No. | OBJECT INFORMATION | VALUE |
|-----|--------------------|-------|
| 1   | RSSI               | −40 dBm OR MORE |
| ... | ...                | ...   |

302

| COMMUNICATION INFORMATION | No. | OBJECT INFORMATION | VALUE |
|---------------------------|-----|--------------------|-------|
| VIDEO PLAYING APPLICATION | 1   | RSSI               | −40 dBm OR MORE |
|                           | 2   | FER                | 10% OR LESS |
|                           | ... | ...                | ... |
| PROTOCOL:TCP DESTINATION IP ADDRESS: ANY DESTINATION PORT NUMBER: 80 | 1 | RSSI | −50 dBm OR MORE |
| ...                       | ... | ...                | ... |

FIG. 8

COMMUNICATION DEVICE, COMMUNICATION CONTROL METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2014-191687, filed Sep. 19, 2014; the entire contents of which are incorporated herein by reference.

FIELD

Embodiments described herein relate to a communication device, a communication control method, and a non-transitory computer readable medium.

BACKGROUND

For Internet communication, TCP (Transport Control Protocol) being a communication system (protocol) using a logical communication channel is generally used. The TCP has some communication control functions in order to perform reliable data communication. The functions include three-way handshake to start data transmission after checking communication destination, a congestion control function to prevent congestion on a physical communication channel, and a retransmission function in the case where packet loss occurs. Furthermore, there is also an arrangement called slow starting to prevent a large quantity of traffic from suddenly flowing into a network. However, at the present time of increased transmission rates and wide variety of communications systems, there is also situations where functions such as the three-way handshake and the slow starting become overhead, and in this case, high-speed communication may be obstructed.

In contrast, in wireless LANs (Local Area Networks), which in recent years, have been rapidly in widespread use, it is known that transmission rates are high at locations close to a wireless LAN access point, whereas transmission rates become low at distant locations. That is, even in one network, it becomes a common case where transmission rates or communication qualities vary according to positions. It is desired to perform effectively communication using the TCP even in such an environment where transmission rates or communication qualities vary within such an identical network.

BRIEF DESCRIPTION OF THE DRAWINGS

FIG. 8 is a diagram showing data to judge a communication environment;

DETAILED DESCRIPTION

According to one embodiment, a communication device includes a first circuitry, a second circuitry and a third circuitry.

The first circuitry establishes a wireless connection with a first communication device, in accordance with a communication request relating to data communication.

The second circuitry measures a communication environment of the communication device to acquire communication environment data.

The third circuitry establishes a logical connection with a second communication device relating to the communication request via the wireless connection and controls so as to perform the data communication with the second communication device in accordance with the communication environment data.

Below, embodiments will be described with reference to the drawings.

First Embodiment

Figure 1:
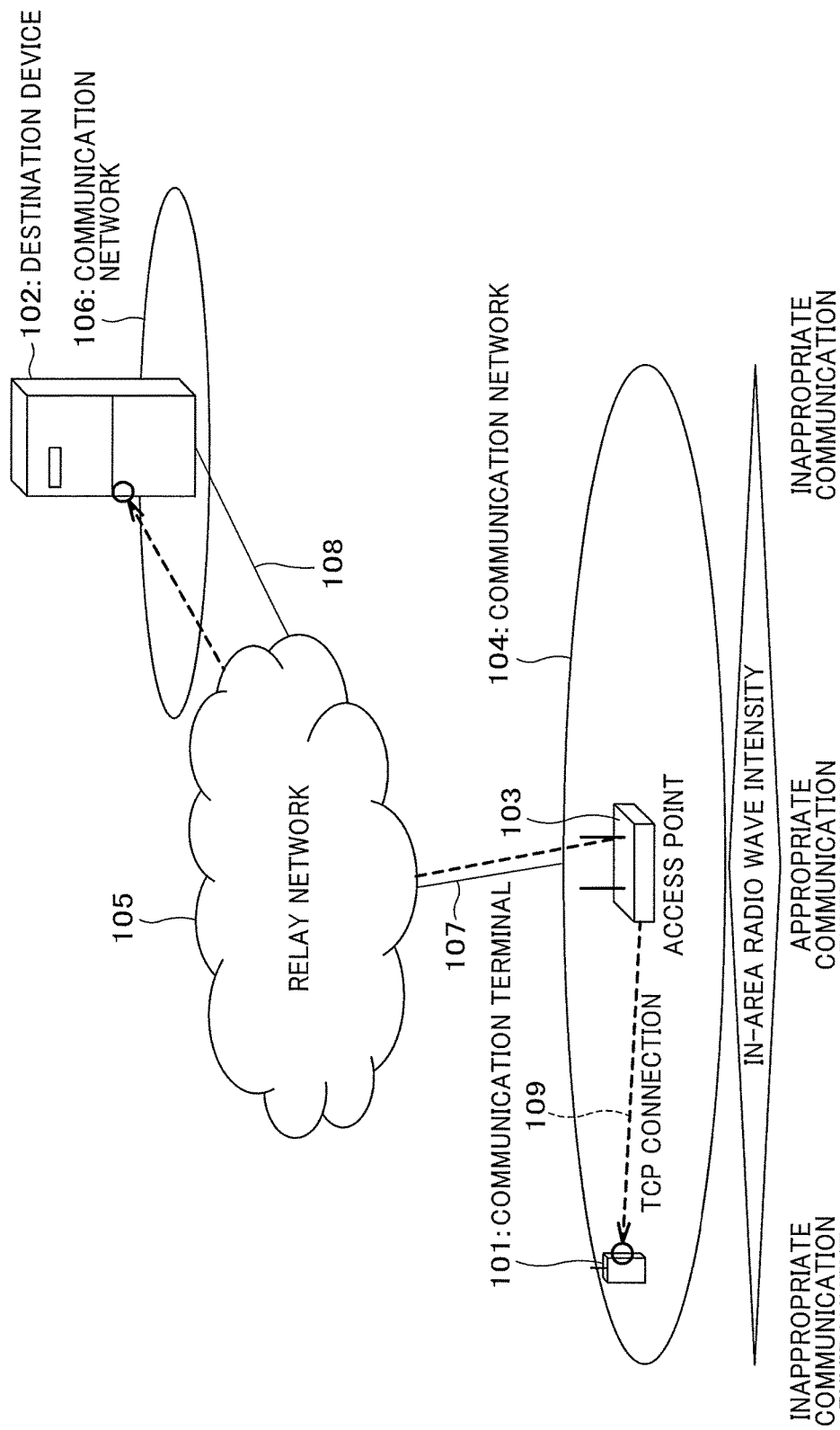
FIG. 1 is a diagram showing a communication environment for a communication device in an embodiment.

FIG. 1 shows an example of a communication environment in a first embodiment.

A communication terminal 101 including the communication device in the present embodiment is shown. When the communication terminal 101 is to transmit data to a destination device 102, the communication terminal 101 establishes a connection to an access point (AP) 103, which is a relay device, and becomes to belong to a communication network 104 that is provided by the AP 103. The AP described here means communication equipment that provides a service to allow connections to a communication network such as a wireless LAN. The AP 103 sends out a radio signal to form a communication area and provides network connectivity through a wireless LAN to communication devices that exist within the area. The transmission destination of the data here is a communication device farther than the AP 103, but the transmission destination of the data may be the AP 103 itself.

The communication network 104 is connected, via a relay network 105, to another communication network 106 to which the destination device 102 belongs. A physical route 107 and a physical route 108 depict routes that physically connect network devices such as routers in a wired or wireless manner, routes enabling communication among networks.

To perform communication with TCP (Transport Control Protocol), the communication terminal 101 establishes a logical communication channel (logical connection) 109 called a TCP connection with the destination device 102 at the time of starting the communication.

The communication network 104 is in an appropriate communication environment close to the AP 103 due to a strong radio signal but is in an inappropriate communication environment at a distance from the AP 103 due to a weak radio signal. In one embodiment, the operation of the communication terminal 101 is controlled under circumstances where such a communication environment changes.

Figure 2:
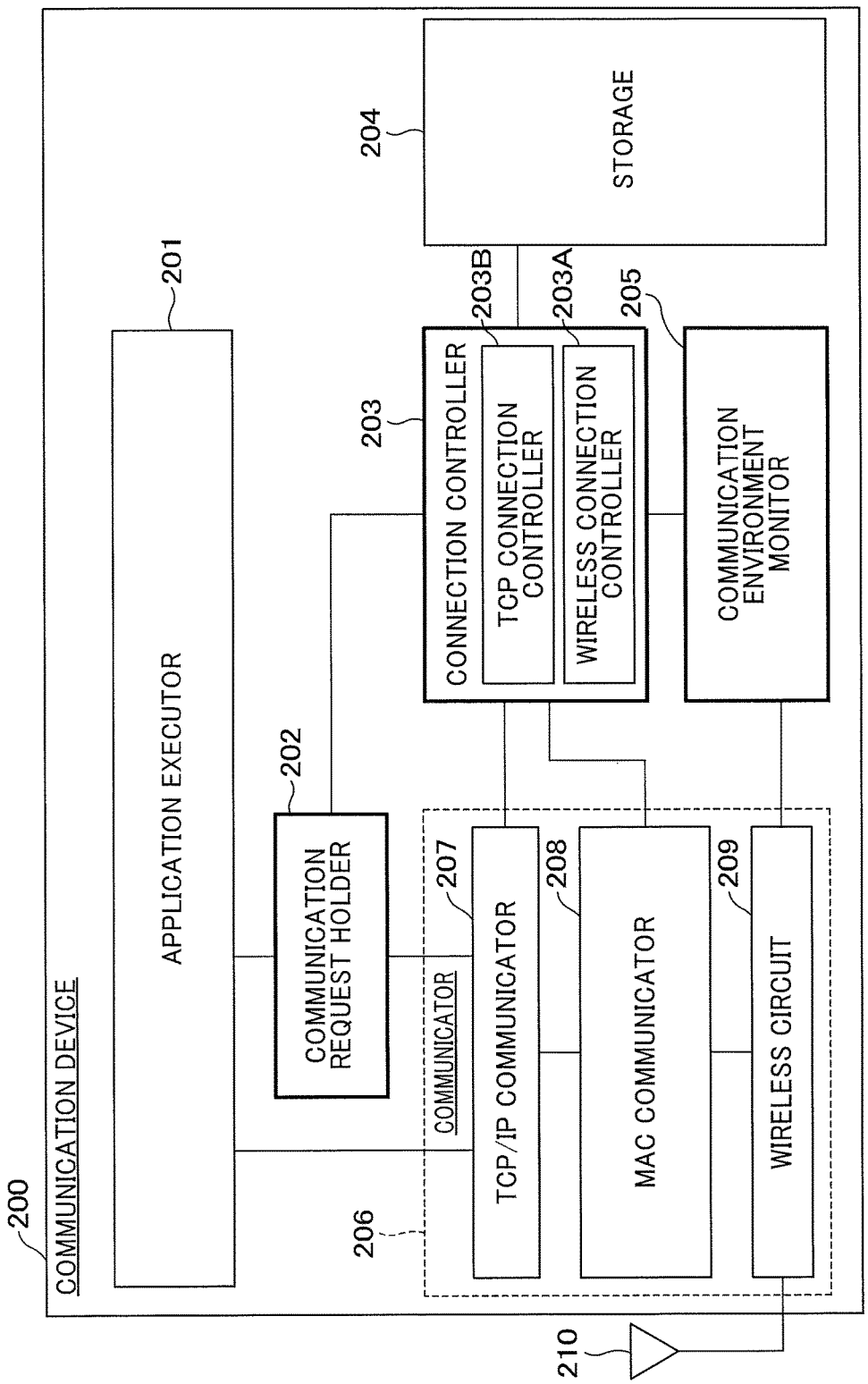
FIG. 2 is a block diagram of a communication device in an embodiment.

FIG. 2 shows a communication device in one embodiment.

A communication device 200 in one embodiment includes an application executor 201, a communication request holder 202, a connection controller 203, a storage 204, a communication environment monitor 205, a communicator 206, and an antenna 210. The connection controller 203 includes a wireless connection controller 203A and a TCP connection controller 203B. The communicator 206 includes a TCP/IP communicator 207, a MAC communicator 208, and a wireless circuit 209. The communication environment monitor 205, the MAC communicator 208, and the wireless circuit 209 form a wireless LAN interface. The application executor 201, the communication request holder 202, the connection controller 203, the communication environment monitor 205 and the communicator 206 can be implemented by circuitry such as a processor or an integrated circuit. Each circuitry which implements the application executor 201, the communication request holder 202, the connection controller 203, the communication environment monitor 205 and the communicator 206 may be different physical circuitry or all or a part of them may be same physical circuitry.

The application executor 201 is a part that executes an application that runs on this communication device. The application may operate in accordance with instructions from a user. When a need to perform data communication with a destination device occurs, this application issues a communication request and outputs the communication request to the communication request holder 202. In the present embodiment, the communication request includes, for example, a request to establish a TCP connection with the destination device (connection establishing request) and a request to transmit a data item (e.g., an HTTP request) (data transmission request). In addition, a data receiving request to receive a data item arriving from the destination device, and the like are also included. These communication requests are separately issued by the application executor 201. When data transmission is performed, one data transmission request may be issued following one connection establishing request, or a plurality of data transmission requests may be issued following one connection establishing request. Note that, as the configurations of the communication requests, one communication request may contain, for example, a command to establish a connection and a command to transmit data. In the present embodiment, it is assumed that a TCP connection is established as the logical connection, but the logical connection is not limited to this. Note that, as will be described below, the application executor 201 may output only a connection establishing request and a data transmission request to the communication request holder 202, and may output the other requests directly to the TCP/IP communicator 207 or the MAC communicator 208, but it is assumed here that a communication request issued by the application executor 201 is once output to the communication request holder 202, and the communication request holder 202 determines the contents of the communication request.

The communication request holder 202 is a part that, in order to prevent a communication request issued by the application executor 201 from being immediately executed, temporarily holds this communication request. By holding a communication request, it is possible to perform processes such as making a wireless connection to the communication network 104 (specifically, wireless connection to the AP 103), establishing a TCP connection with a communication destination, and standby for data communication after the establishment of the TCP connection during this time. A held communication request is transmitted to the TCP/IP communicator 207 and executed in response to an instruction from the connection controller 203 or the like. Although it is assumed here that the instruction is received from the connection controller 203, it is possible to receive the instruction from another processing unit. A communication request to be held is assumed to be a connection establishing request and a data transmission request.

The connection controller 203 performs control relating to connection and authentication in a wireless LAN, and connection and data communication in TCP/IP. In more detail, the connection controller 203 includes the wireless connection controller (first connection controller) 203A and the TCP connection controller (second connection controller) 203B. The wireless connection controller 203A performs control relating to connection to the AP 103 (initiation, termination and reconnection) and authentication, by way of an AP connecting function held by the MAC communicator 208. The TCP connection controller 203B performs control, on the TCP/IP communicator 206, relating to the initiation or termination of a logical connection TCP and the initiation, pause, or termination of data transmission/reception. The connection controller 203 acquires information necessary for the control from the storage 204 and the communication environment monitor 205, and issues instruction relating to the control to the communication request holder 202 and the communicator 206.

The storage 204 is a part in which data such as information used by the connection controller 203 is stored. Conceivable data is information relating to a communication environment such as the strength of a radio signal, information on a connectable AP, and information on an application executed by the application executor 201, but may be other kinds of information. Data transmitted to the destination device or data received from the destination device (e.g., data transmitted from a destination device as a response to transmitted data) may be stored. The storage 204 may be formed by any storage device such as RAM (Random Access Memory), a NAND flash memory, a disk device, and a NAS (Network attached storage). The storage 204 may include both a volatile memory and a nonvolatile memory.

The communication environment monitor 205 is a part that monitors a communication environment around the communication device 200 such as a radio wave condition. For example, the strength of a radio signal received from the AP 103, surrounding noise, and the like are monitored. The communication environment monitor 205 transmits data on the monitoring (communication environment data) to the connection controller 203. In addition, this data may be stored in the storage 204 or the like.

The communicator 206 is a part that manages communication with an AP or a destination device, and includes the TCP/IP communicator 207, the MAC communicator 208, and the wireless circuit 209.

The TCP/IP communicator 207 performs various communication processes relating to TCP/IP such as the TCP layer and the IP layer.

The TCP/IP communicator 207 operates in response to instructions from the connection controller 203. The TCP/IP communicator 207 executes a request output from the communication request holder 202 to create a packet. The issued packet is transmitted to the MAC communicator 208. In addition, the TCP/IP communicator 207 receives a packet from the MAC communicator 208, performs a receiving process on the packet, and passes data in the packet to the application executor 201.

The MAC communicator 208 performs various communication processes in the MAC layer. The MAC communicator 208 receives a packet from the TCP/IP communicator 207, adds a MAC header and the like to create a MAC frame, and outputs the MAC frame to the wireless circuit 209. In addition, the MAC communicator 208 receives a MAC frame from the wireless circuit 209, performs a receiving process on the MAC frame, and passes a packet to the TCP/IP communicator 207. Additionally, the MAC communicator 208 may perform various processes relating to management and control relating to the MAC layer. As an example, the MAC communicator 208 has an AP connecting function of performing a process for connecting to an AP (selection and authentication of the AP). With the AP connecting function, the creation and transmission of various frames for connection and authentication, and the reception and analysis of a frame are performed. Although the AP connecting function is held here by the MAC communicator 208, the AP connecting function can be also performed by the application executor through software operation.

The wireless circuit 209 performs a process in the physical layer (e.g., addition of a physical header, encoding, modulation) on a frame (MAC frame) input from the MAC communicator 208 to create a PHY packet. The wireless circuit 209 performs DA conversion on the PHY packet, performs analog processing such as frequency conversion (up conversion) and amplification on the converted analog signal, and emits a signal into a space via the antenna 210, as a radio signal. In addition, when receiving a signal via the antenna 210, the wireless circuit 209 performs analog processing such as amplification and frequency conversion (down conversion) to create a PHY packet. The wireless circuit 209 performs a process in the physical layer (e.g., demodulation, decoding, and analysis of a physical header) on the PHY packet to acquire a MAC frame, and outputs the MAC frame to the MAC communicator 208. In addition, the wireless circuit 209 outputs the signal of a radio signal received via the antenna 210 to the communication environment monitor 205 for the measurement of surrounding communication environment.

Figure 3:
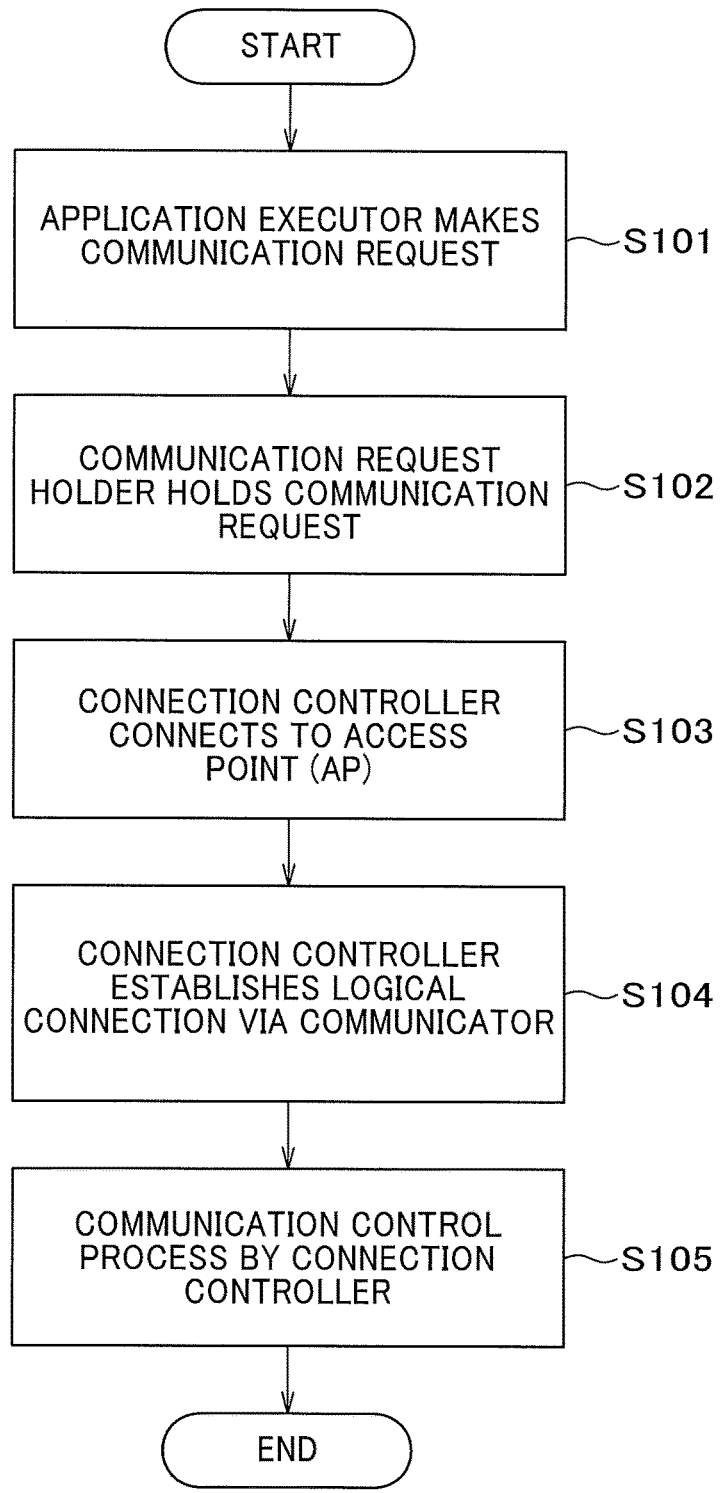
FIG. 3 is a flow chart schematically showing a communication start process in an embodiment.

FIG. 3 shows a schematic flow chart a communication start process in the present embodiment. The flow of the communication start process will be briefly described below, and each step will be described thereafter in detail.

When a need of communication arises in an application being executed, the application executor 201 issues a communication request (S101). This communication request is transmitted to the communication request holder 202. For example, when a need of data communication of a destination device arises, the application executor 201 issues the communication request. As an example, a connection establishing request is issued (e.g., connect( )), and thereafter, one or more data transmission requests are issued (e.g., send( )). The data transmission request may be issued after the execution of the connection establishment request is completed.

The communication request holder 202 receives the communication request, determines whether the communication request is a request that involves the establishment of a connection or a data transmission request using the established connection (hereafter, these will be collectively referred to as a connection-establishment-related request), and holds the communication request if the communication request is the connection-establishment-related request (S102). A hold notification of the communication request is transmitted to the connection controller 203.

The connection controller 203 receives the hold notification of the communication request from the communication request holder 202, and performs a connecting process to the AP 103 (S103). Note that, in the present embodiment, it is assumed from the viewpoint of power saving and the like that the connecting process to the communication network is performed after the communication request is received, but the connecting process may be performed in advance or independently of the reception.

After a connection to the AP 103 succeeds, the connection controller 203 performs a connection establishment process on a destination device using the TCP/IP communicator 207 (S104). Here, the establishment of a connection means that a communication terminal and a destination device are connected to each other on a logical communication channel with TCP. At the time of establishing a connection, a three-way handshake is performed with the destination device. The three-way handshake is a procedure to check whether communication destination can respond, in advance of starting communication. This is one of the functions that ensure the reliability of TCP.

After establishing the connection, the connection controller 203 performs a communication control process that involves, via the connection, data transmission and data reception and the like as a response to the data transmission (S105). In this communication control process, the control of processes such as data transmission, interruption, standby, and termination is performed using the data (communication environment data) from the communication environment monitor 205 and the data stored in the storage 204 as criteria for determination. The communication can be interrupted because the connection controller 203 checks the communication environment also after the start of the communication, and interrupts the communication if it is determined that the communication environment deteriorates. The deterioration of the communication environment increases the possibility of data corruption or loss in transmitted packets, following which the possibility of retransmission of packets is increased. The retransmission influences on the AP 103 and the other communication device using the same AP 103, and thus there may be a case where, in order to reduce the influence on the surroundings, the communication should be interrupted if the communication environment deteriorates.

Each of the processes in FIG. 3 described above will be described in detail.

Figure 4:
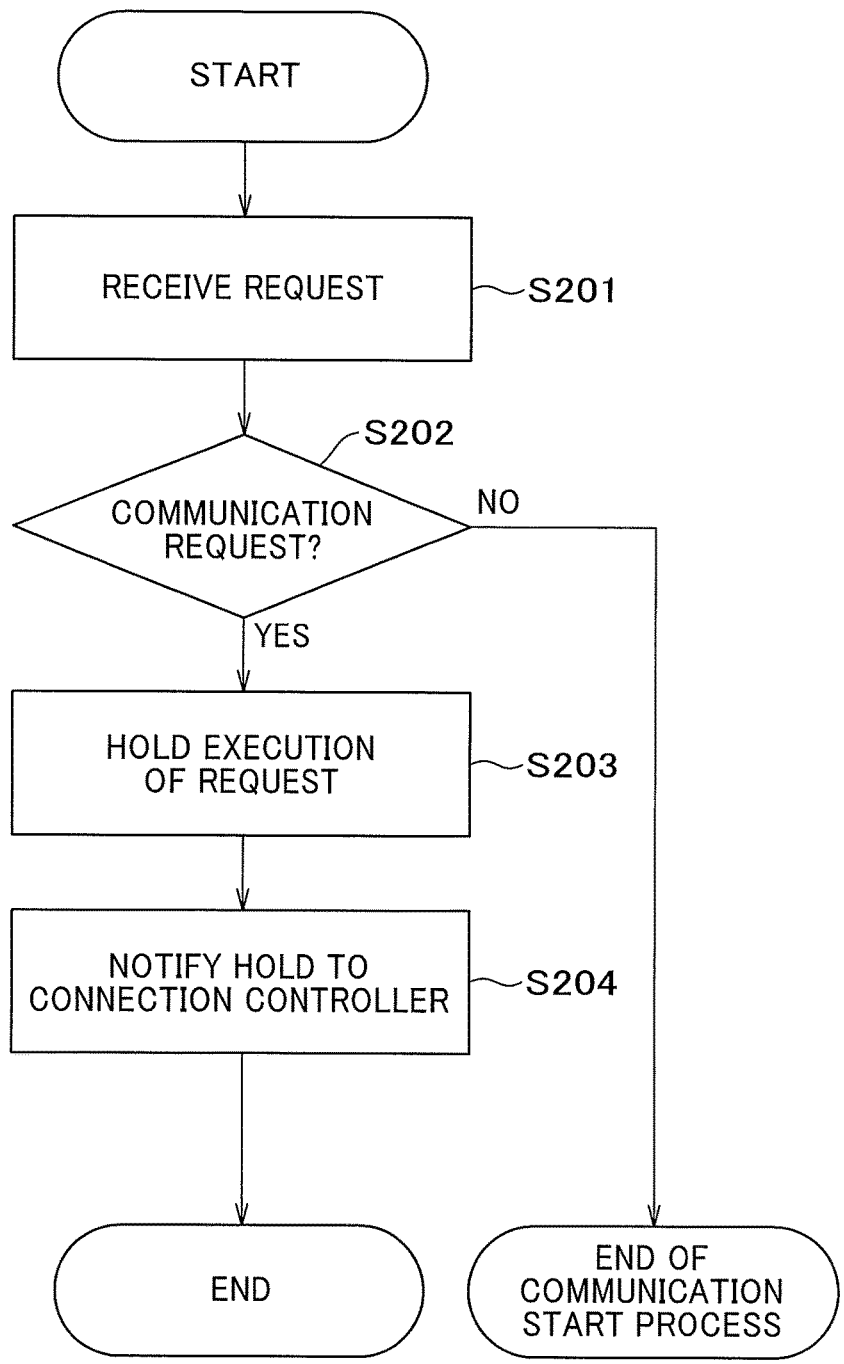
FIG. 4 is a flow chart of a communication request holding process in an embodiment n.

With respect to the communication request holding process in FIG. 3 (S102), FIG. 4 shows a flow chart of the communication request holding process. It is assumed here that the communication request holder 202 is provided through the use of a socket application programming interface (Socket API: Socket Application Programming Interface) that connects the application executor 201 and the communicator 206.

A socket receives commands (program functions) from the application executor 201 (S201). When receiving a function relating to a communication request among the program functions, such as connect( ) being the function for a connection establishing request and send( ) being the function for a data transmission request (YES in S202), the communication request holder 202 does not execute but hold the function (communication request) (S203). Then, the communication request holder 202 notifies the hold of the communication request to the connection controller 203 (S204). In the case of the other request (NO in S202), the communication request is not held but immediately output to the TCP/IP communicator 207, and the whole communication start process is finished. The communication request holder 202 determines here whether an input communication request is a connection-establishment-related request, but the application executor 201 may input only a connection-establishment-related request (a connection establishing request and a data transmission request) to the communication request holder 202, and the communication request holder 202 may always hold the communication request input from the application executor 201. As to the other communication requests (e.g., a PING request, a data receiving request (recv( )), the application executor 201 may directly output them to the TCP/IP communicator 207.

Figure 5:
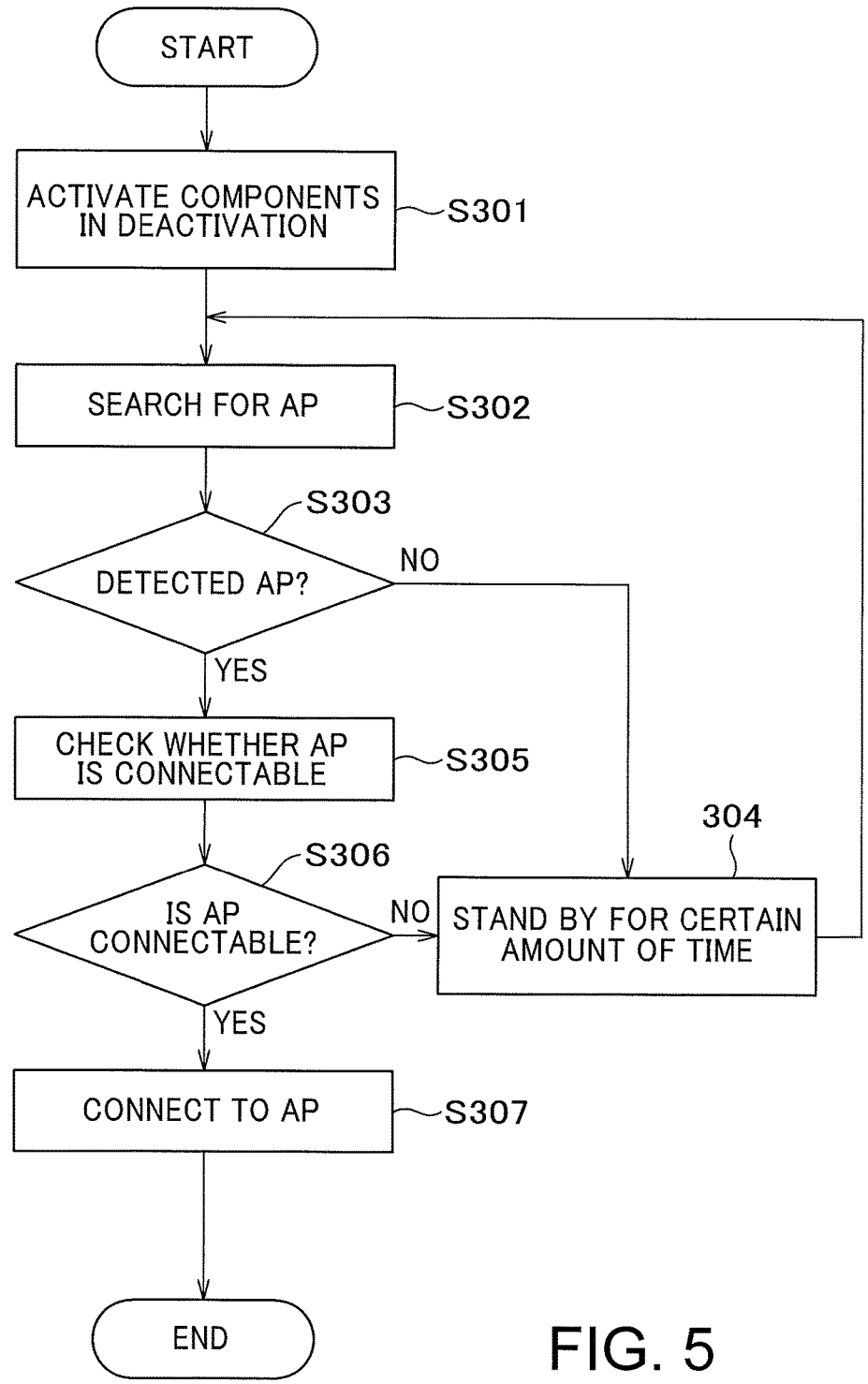
FIG. 5 is a flow chart of a connecting process to an AP in an embodiment.

With respect to the connecting process to the AP (S103) in FIG. 3, FIG. 5 shows a flow chart of this process.

When the wireless LAN interface (the communication environment monitor 205, the MAC communicator 208, and the wireless circuit 209) is deactivated, the connection controller 203 first activates the wireless LAN interface (S301). The deactivation refers to bringing about a power-saving state such as a sleeping state until a need to perform communication arises, for reasons of power saving or the like, and the activation refers to shifting to an operable state, from the sleeping state or the like. Deactivating the wireless LAN interface means bringing all or some of the parts in the wireless LAN interface into the power-saving state. Note that this process is unnecessary if the wireless LAN interface is originally activated.

The connection controller 203 searches for an AP that provides a connecting service to a communication network (S302). Conceivable searching methods include a method in which a searching request frame is subjected to broadcast transmission by way of an AP connecting function of the MAC communicator 208 and a response frame from an AP that receives the searching request frame is received, and a method in which a beacon frame emitted by an AP is detected by the AP connecting function of the MAC communicator 208, but the search may be performed by methods other than the methods described here.

If no AP can be detected (NO in S303), the connection controller 203 returns back to searching for an AP after being on standby for a certain amount of time (S304). If an AP can be detected (YES in S303), the connection controller 203 or the AP connecting function checks whether the AP is a connectable AP (S305). Conceivable methods of checking whether the AP is connectable include a method in which it is determined that the AP is an AP that is connectable for any device, based on information such as a beacon frame received from the AP, and a method in which it is checked whether the AP is registered in this communication device in advance, but the check may be performed by methods other than the methods described here.

If it is determined that the AP is not connectable (NO in S306), the connection controller 203 returns back to searching for an AP after being on standby for a certain amount of time (S304). If it is determined that the AP is connectable (YES in S306), the connection controller 203 performs connection and authentication to the AP using the AP connecting function (S307). Any method such as WPA-PSK and WPA-EAP can be used for an authenticating method.

Figure 6:
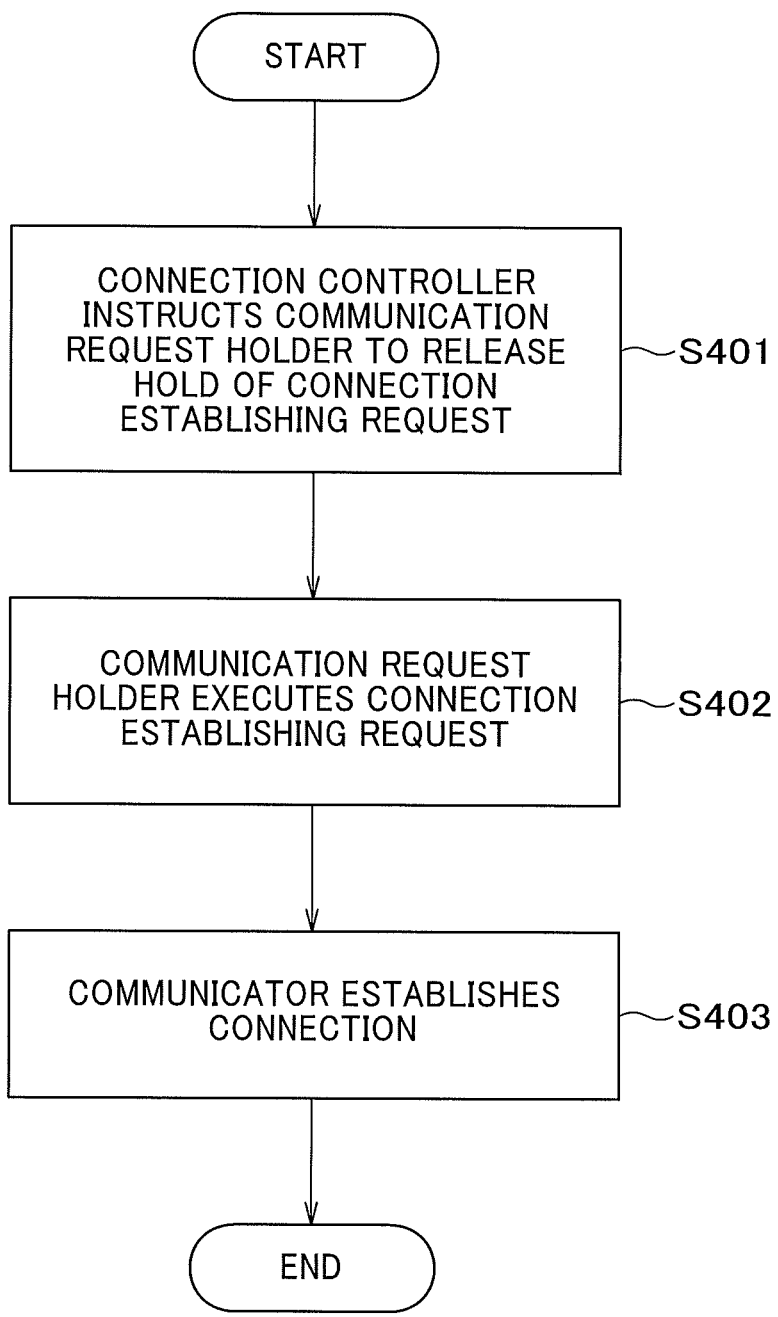
FIG. 6 is a flow chart of a connection establishing process in an embodiment.

Next, the connection establishment process (S104) in FIG. 3 will be described. FIG. 6 shows a flow chart of the connection establishment process.

The connection controller 203 instructs the communication request holder 202 to release only a connection establishing request out of the held communication requests (S401). The communication request holder 202 receiving the releasing instruction executes only the connection establishing request (S402). For example, when the communication request holder 202 holds connect( ) to issue an instruction to establish a TCP connection with a destination device and send( ) to issue an instruction on data transmission, the communication request holder 202 executes only the held connect( ) and does not execute send( ). The TCP/IP communicator 207 of the communicator 206 establishes a TCP connection with a destination device by a method normally implemented in TCP (S403). Note that the number of connections to be established can be one or more.

Figure 7:
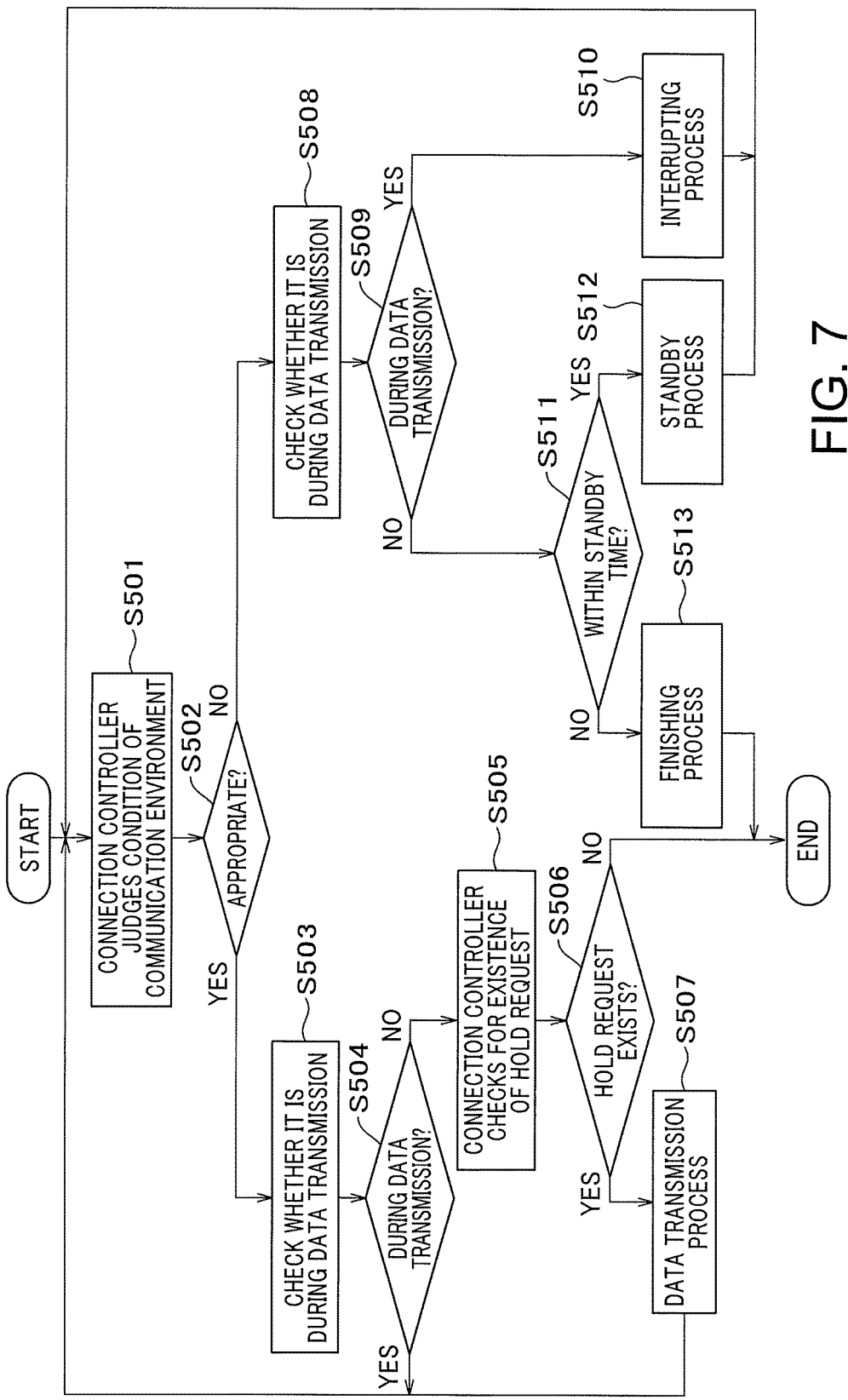
FIG. 7 is a flow chart of a communication control process in an embodiment.

Next, the communication control process (S105) in FIG. 3 will be described. FIG. 7 shows a flow chart of this process.

The connection controller 203 judges the conditions of the communication environment based on information (communication environment data) detected by the communication environment monitor 205 (S501), and changes a process in accordance with this judgment. That is, it is determined whether the communication environment meets a communication condition, and the communication environment is determined to be appropriate if the communication condition is met, or the communication environment is determined to be inappropriate if the communication condition is not met. Note that this determination may be performed at a predetermined time point or at predetermined intervals, or upon the detection of information, the reception of an instruction, or the like.

A specific determining method may be comparison with reference data, comparison with past monitoring data (communication environment data measured in the past), or the other methods. In the case of the comparison with past monitoring data, it is conceivable, for example, to determine the case where a value is less than or equal to the average of past monitoring data items to be inappropriate. In the case of comparison with reference data, the reference data may be stored in the storage 204 or the like or may be input from an input device by a user and used.

Items used for the determination may be any information, such as a received signal rate, a receive signal strength indicator (RSSI), a signal noise ratio (SNR), a signal-to-interference plus noise rate (SINR), a packet delivery rate (PDR), a frame error rate (FER), a bit error rate (BER), a clear channel assessment (CCA), and the number of beacons that cannot be received, as long as the information can detected and used for superiority determination. In addition, the number of information to be used may be one or more, with which comprehensive determination may be performed.

FIG. 8 shows data on the judgment reference values of the communication environment stored in the storage 204, as an example of the reference data. A table (301) in the upper half of the drawing shows a reference value having object information being RSSI and a value of −40 dBm or more, in a row NO. 1. The object information is the identifier of information necessary to judge the communication environment, for example, a name.

A table (302) in the lower half of the drawing shows an object information and a reference value for each piece of communication information to identify individual applications, communications, and the like, which allows conditions to be set in more detail. The identification of a communication is performed with, for example, a set of a communications system (protocol), a communication destination IP address, and a port number to be used. The communication destination IP address of "Any" means that the IP address of a communication destination does not matter. In addition, the port number is a number to identify a program on the communication destination side at the time when a computer performs data communication. The shown example of communication means that TCP is used as a communications protocol, and a communication is addressed to TCP port number 80 of any communication destination. Pieces of information to be set to the columns of communication information are not limited to the above application and communication, and may be information that can be identified by the connection controller 203.

Actually, to "video application" in the drawing, an identifier to uniquely identify an application is set. To identify a running application, for example, when a process is started, the video application may be overwritten with an identifier such as a process ID. Both the tables in the upper and lower halves of the drawing may be stored, or only one of them may be stored. When both of them are stored, the table in the upper half may be used when, for example, no entry of communication information in the lower half is matched, or only one of them may be used. The condition and saving form shown in FIG. 8 is merely an example and may be saved in other forms.

The description will be made referring back to the flow chart in FIG. 7. When the communication environment is appropriate (YES in S502), it is checked whether data is being transmitted (S503). Conceivable methods of checking whether the data is being transmitted include a method in which the check is made by transmitting a return value of data transmission request completion to the communication request holder 202 or the like as a response after the transmission of the data is finished, a method in which a packet received by the TCP/IP communicator 206 is checked, and a method in which the state of an application is checked, but the check may be performed by methods other than the methods described here. If it is during the data transmission (YES in S504), nothing is performed but the data transmission continues. If it is not during the data transmission (NO in S504), it is checked whether there is a held request (S505), and if there is no held request (NO in S506), which means that the execution of all requests is completed, the process is finished. At the time of finishing, the connection with the AP may be disconnected, and the wireless LAN interface may be deactivated. In addition, there is a case where there is no held request but an application is running, and thus a new communication request may be waited to be issued. In addition, during the standby, packets (maintenance packets) to maintain the logical connection may be transmitted. If there is a held request (data transmission request) (YES in S506), a data transmission process is performed (S507).

Figure 9:
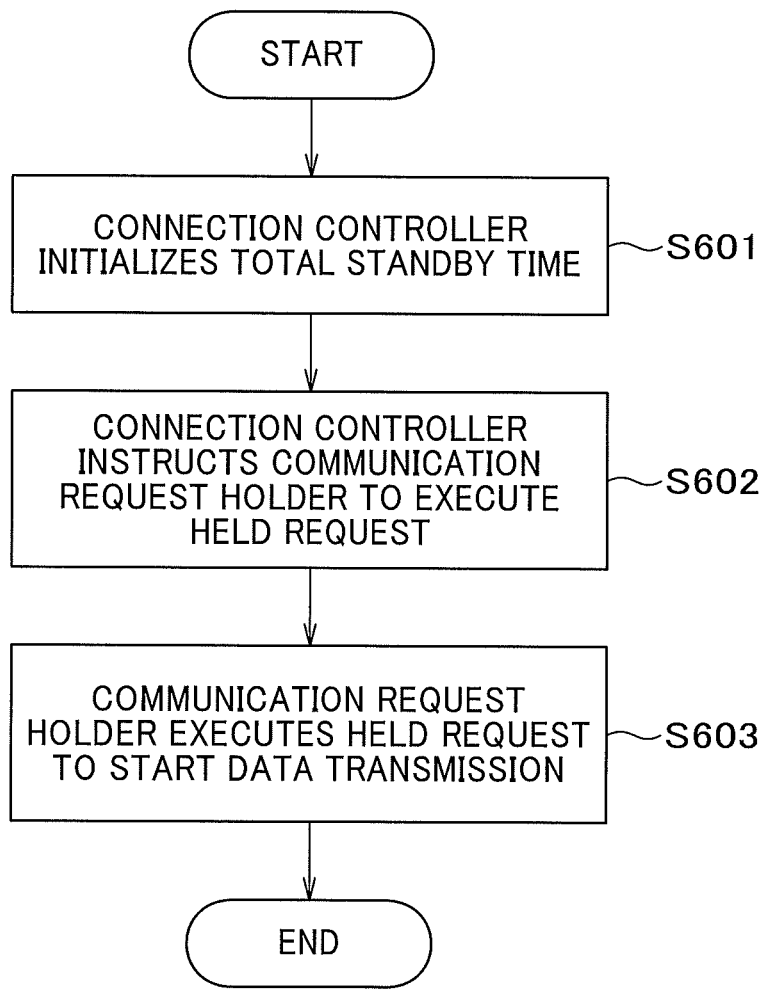
FIG. 9 is a flow chart of a data transmission process performed in the communication control process in FIG. 7.

FIG. 9 shows a flow chart of the data transmission process (S507). In the data transmission process, the connection controller 203 (e.g., the connection controller 203B) first initialize a total standby time (S601). The total standby time is to measure, for a data transmission request, a time for which standby for the data transmission is continued (e.g., an elapsed time from the creation of the data transmission request). The connection controller 203 (e.g., the connection controller 203B) includes a unit for managing the elapsed time. The value of the total standby time may be held by the connection controller 203 or stored in the storage 204 or the like. Performing the data transmission process means that the total standby time does not reach a limit value (upper limit), and thus the total standby time is initialized in this process.

Next, the connection controller 203 instructs the communication request holder 202 to execute a held request (S602), and the communication request holder 202 executes the held request (e.g., send( ) (S603) to transmit data via the communicator 206. In this case, since a connection is established before the data transmission, and the three-way handshake is not performed. Therefore, the transmission of data can be quickly started.

In addition, at the time of the data transmission, reconnection with the AP may be performed. When a connection with the AP is made under conditions where the communication environment is inappropriate, even when the communication environment is improved, an appropriate transmission rate cannot be gained due to a code modulation scheme (transmission rate) that is selected at the time of connecting. In such a case, reconnecting to the AP, the code modulation scheme (transmission rate) can be selected under appropriate communication environment conditions, which may improve the transmission rate.

Figure 10:
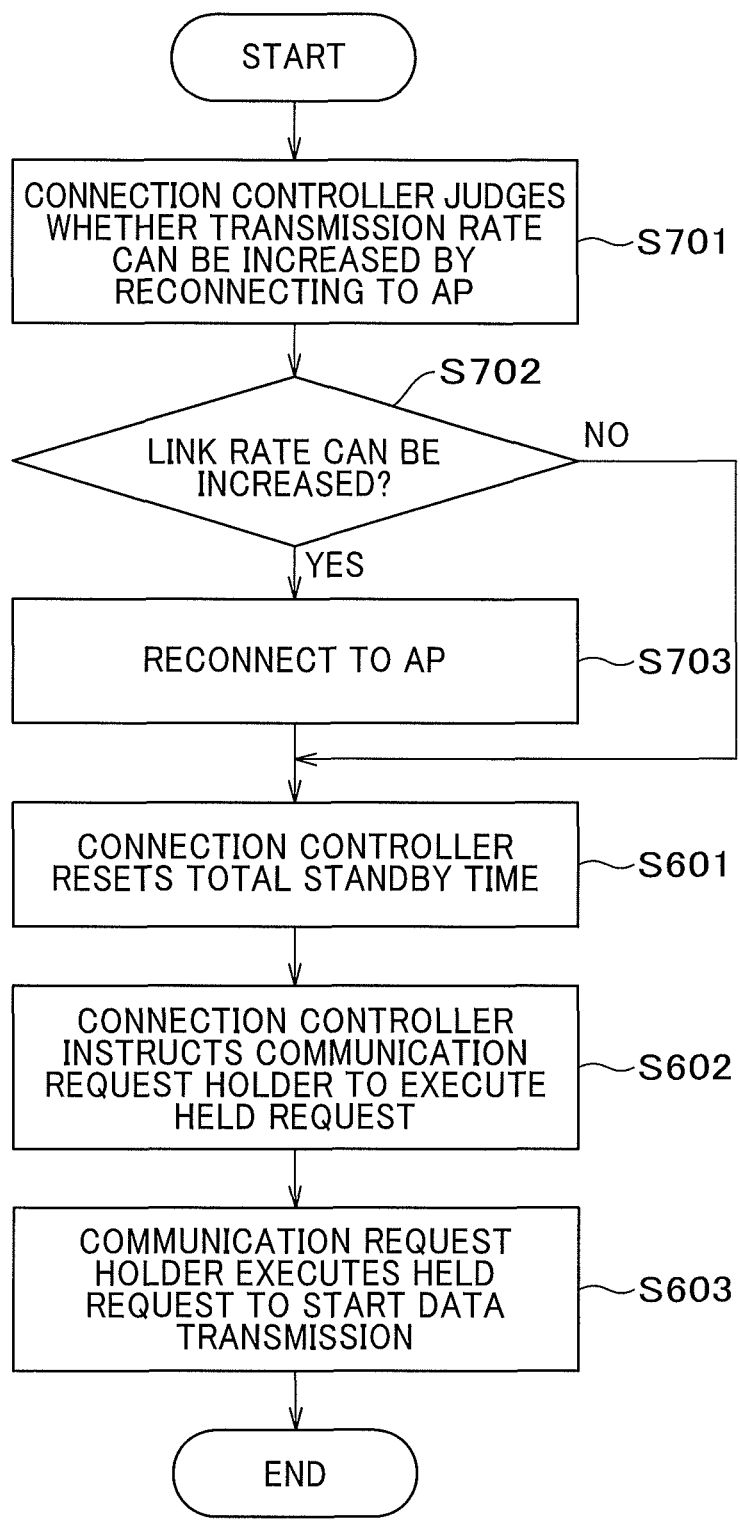
FIG. 10 is a flow chart in which a reconnecting process to an AP is added to the data transmission process in FIG. 9.

Therefore, as in a flow chart of another example of the data transmission process shown in FIG. 10, the connection controller 203 determines whether a transmission rate can be improved by the reconnection to an AP (S701). For example, if the strength of a received signal from the AP is higher than that in the previous AP connection, it can be determined that the transmission rate is expected to be improved. Alternatively, when a code modulation scheme and the like are known in advance for each range of signal intensity, it may be determined whether the transmission rate can be improved from the current rate based on the value of a reception strength this time. If the transmission rate is expected to be improved (YES in S702), a current wireless connection is disconnected, and the connection to the AP is done over again (S703). Note that, at this point, the current logical connection remains maintained. The subsequent processes are the same as those in the data transmission process shown in FIG. 9. In the case where there is another connectable AP that has a high transmission rate, if the IP address of a communication terminal is not changed and the other AP can be used without disconnecting the logical connection, it is conceivable to reconnect to the other AP.

The description will be made referring back to the flow chart in FIG. 7. If the communication environment is not appropriate (NO in S502), it is checked whether data is being transmitted (S508), and if it is during the transmission (YES in S509), an interrupting process is performed (S510). If it is not during the data transmission (NO in S509) and if the above-mentioned total standby time is within a standby time (YES in S511), a standby process is performed (S512). However, if the above-mentioned total standby time exceeds the limit value (NO in S511), a finishing process is performed (S513).

Figure 11:
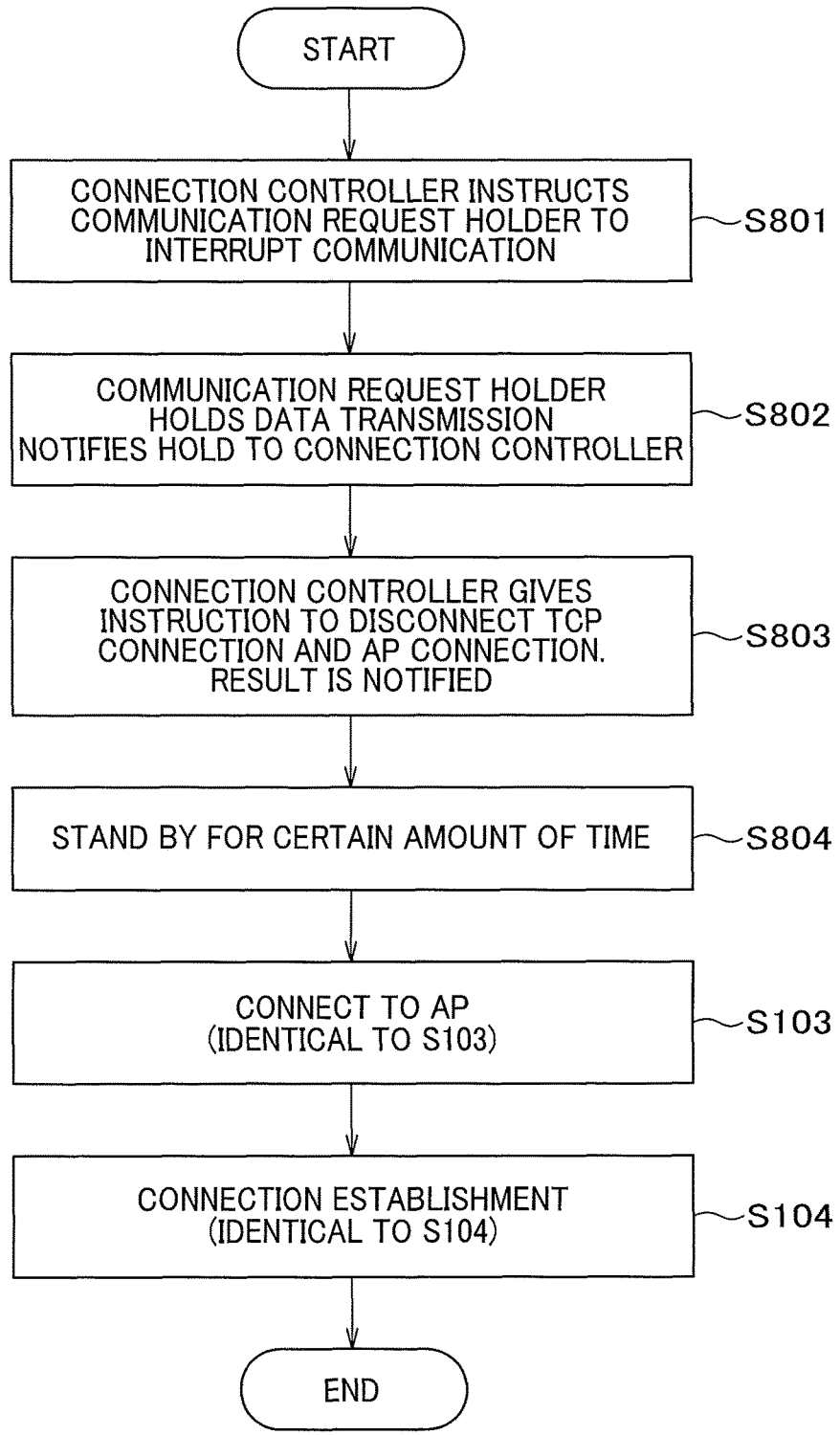
FIG. 11 is a flow chart of an interrupting process performed in the communication control process in FIG. 7.

With respect to the interrupting process (S510), FIG. 11 shows a flow of this process.

The connection controller 203 instructs the communication request holder 202 to interrupt communication (transmission) (S801). The communication request holder 202 once stops (holds) its data transmission and notifies the hold to the connection controller 203 (S802). The connection controller 203 receiving the notification instructs the communicator 206 to disconnect the AP connection and the logical connection, and the disconnections are performed (S803). A disconnecting method of a TCP connection may be disconnection due to no communication for a certain amount of time after the establishment of an AP connection or may be forcible termination of communication by transmitting a packet that contains a specific instruction. Conceivable forcible terminating methods include a method of transmitting a RST packet, in which a RST field is set to the header part of a TCP packet, to one-sidedly notify the termination of the communication to a communication destination, but the forcible termination may be performed by methods other than the methods described here. Note that, as a modification of the interrupting process, it is possible that only the data transmission is not performed while a wireless connection and a TCP connection remains maintained.

After the disconnection, the connection controller 203 stands by for a certain amount of time expecting that the communication environment is improved (S804). Note that if there is another connectable AP, the connection controller 203 may not stand by but try connecting to the other AP. After standing by for certain amount of time, the connection controller 203 performs a connecting process to the AP and establishes a connection. The connecting process to the AP is the same as the AP connecting process in the communication start process (S103). Note that if a plurality of APs are detected in searching for an AP (S302) in the connecting process to an AP (S103), these APs may be treated as the next connection candidates. In the establishment of the connection at this point, a connection establishing request that is executed at the first establishment of the connection may no longer exist, and thus this connection establishing request may be backed up in advance and the copied connection establishing request may be used at the time of resuming the data transmission. Alternatively, if possible, a connection establishing request may be issued from a data transmission request. In addition, at the time of resuming the data transmission, data subsequent to data transmitted up to the previous time may be transmitted, or data may be retransmitted from the beginning.

Figure 12:
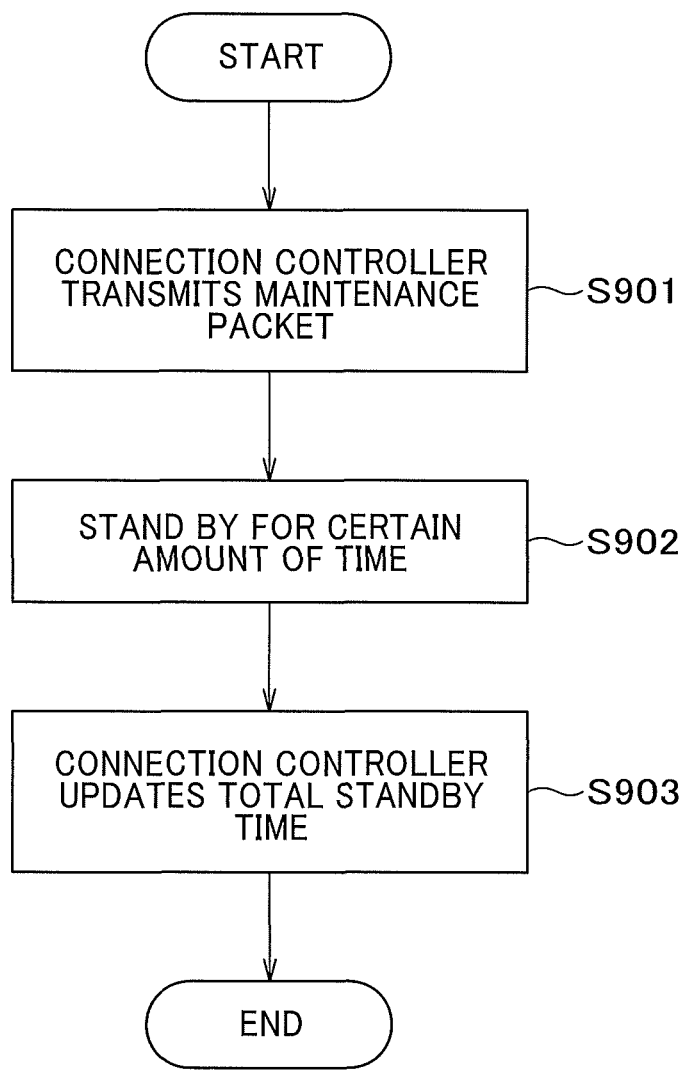
FIG. 12 is a flow chart of a standby process performed in the communication control process in FIG. 7.

With respect to the standby process (S512) in FIG. 7, FIG. 12 shows a flow of this process. In the standby process (S512), the connection controller 203 transmits a maintenance packet via the TCP/IP communicator 207 (S901) and stands by for a certain amount of time (S902). Since the logical connection is disconnected by a destination device if no packet arrives for the certain amount of time, it is required to transmit a packet before the connection is disconnected. Note that a method of maintaining the connection is not only to transmit packets at given intervals, but also to transmit a packet irregularly or immediately before the connection is disconnected. In addition, transmitting a maintenance packet in which a data item called a window size is set to zero causes the destination device to transmit no packet. The connection controller 203 adds the standby time period of this time to the total standby time to update the total standby time (S903).

Figure 13:
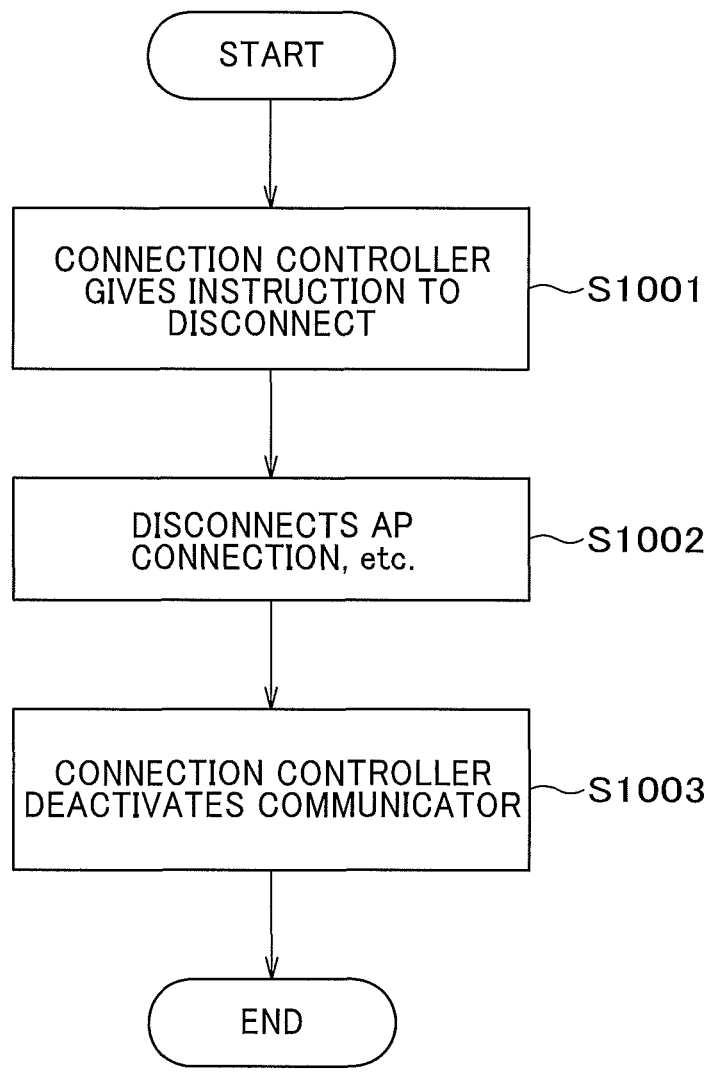
FIG. 13 is a flow chart of a finishing process performed in the communication control process in FIG. 7.

With respect to the finishing process (S513) in FIG. 7, FIG. 13 shows a flow of this process. In the finishing process (S513), the connection controller 203 instructs the communicator 206 to disconnect a communication connection (S1001), the communicator 206 disconnects the logical connection and the AP connection (S1002), and after the disconnection, the wireless LAN interface is deactivated (S1003). In the present embodiment, from the viewpoint of power saving and the like, the deactivation to shift the parts to be unused to a state such as sleeping state until communication is needed is performed, but the deactivation may not be performed.

As described above, in the present embodiment, at the time of connecting to an AP, a connection with a destination device is established, data transmission is waited until a communication environment is brought into an appropriate state that allows the data transmission, and when the appropriate state is brought about, the data transmission (the reception of a response thereto, as needed) is performed. By this control, it is possible to reduce a load on the communication device due to the retransmission of a packet, a load on an AP that received the retransmitted packet, and influence on other communication devices using the same AP, and to shorten a time taken to actually transmit data (actual transmission time). Furthermore, by establishing a connection in advance, it is possible to start data transmission without being subjected to the restriction of the three-way handshake, which enables the transmission time to be further shortened.

Note that, in the present embodiment, at the time of connecting to an AP, a connection with destination device is established regardless of the state of a communication environment, the connection may be established only in the case where the communication environment satisfies a communication condition. By making the communication condition at this point lenient than the communication condition for data transmission (i.e., by making the communication condition for data transmission stricter than the communication condition for connection establishment), it is possible to provide effects similar to those in the present embodiment described thus far. For example, when the communication condition for data transmission is −40 dBm or more (refer to FIG. 8), it is conceivable to relax a required value such as making the communication condition for connection establishment −80 dBm or more. Alternatively, when the communication condition for data transmission requires a plurality of condition items to be satisfied, it is conceivable to make the communication condition for connection establishment satisfy some of the plurality of condition items. The communication condition for data communication and the communication condition for connection establishment are, as an example, conditions that characterizes a state where the loss, error, or congestion of information in data communication is difficult to occur, and the communication condition for data communication requires the state to be more difficult to occur than the communication condition for connection establishment (a stricter condition). In such a manner, by setting a communication condition for performing the connection establishment also to the connection establishment, it can be expected to establish a connection only in the case where the communication environment is expected to be improved.

Second Embodiment

There are many applications that require a large quantity of data to be exchanged in a time as short as possible, such as a video browsing application in which an image is distorted due to communication delay or the like. However, slow starting, one of the TCP functions, suppresses data transmission immediately after the start of communication in order to secure the reliability of the communication. Thus, a process to avoid the influence of the slow starting as much as possible is added.

The slow starting is one of congestion control functions provided in the TCP. When some device transmits a large quantity of data when starting communication, traffic in a network is suddenly increased, which has an influence on communication by other devices. For this reason, the number of packets that a destination device can transmit at once is suppressed at the time of starting the communication, and the number of transmittable packets is gradually increased. However, if a communication environment is appropriate and it is required to transmit a large quantity of data in a time as short as possible, the slow starting is an obstacle to high-speed transmission.

Figure 14:
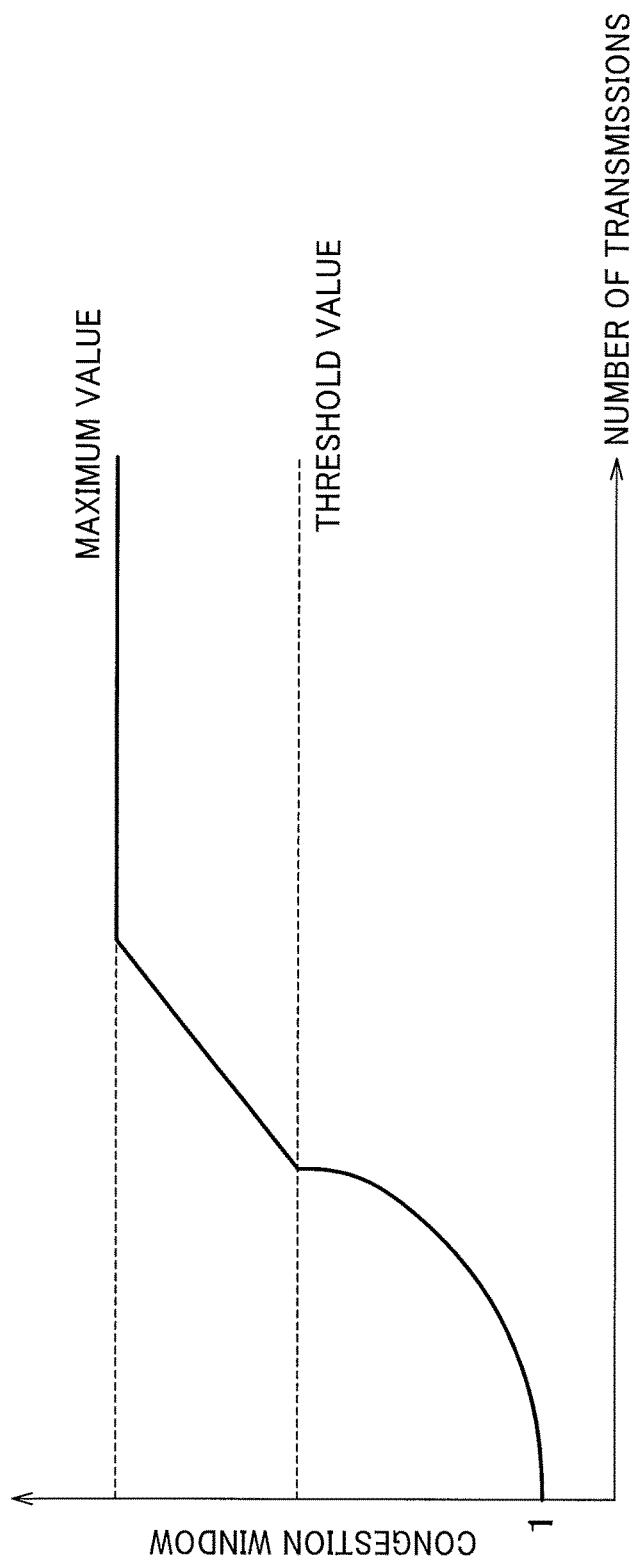
FIG. 14 is a relationship diagram between the number of transmission packets and the size of a congestion window, illustrating slow starting.

FIG. 14 shows a relationship diagram between the number of transmission packets and the size of a congestion window, illustrating the slow starting. The term "congestion window" of the vertical axis represents the number of packets that a transmission side can transmit at once. The horizontal axis represents the number of transmissions in which packets are exchanged with a reception side. Before communication is started, the number of packets that transmission side can transmit is one. Thereafter, the size of the congestion window is doubled whenever the transmission side transmits a packet and receives an Acknowledge packet (ACK) from the reception side until exceeding a threshold value. When exceeding the threshold value, the size of congestion window is incremented by one until reaching a maximum value but does not exceed the maximum value. Therefore, immediately after the communication is started, packets cannot be transmitted in large quantity. However, if it is possible to increase the size of the congestion window before transmitting data that requires a large quantity of packets to be transmitted at once, a large number of packets can be transmitted from immediately after the data transmission, and more data can be transmitted in a short time.

Thus, if there is a communication request that calls upon data having a small data size such as a text message to be transmitted as a response, in a held communication request (data transmission request), even if the communication environment is inappropriate, a precedent transmission process to cause a destination device to transmit data having a small data size prior to other data is performed so as to increase the size of the congestion window as large as possible. Then, after the communication environment is improved, control is performed to cause the destination device to transmit a large quantity of data.

However, if the communication environment is very inappropriate, this precedent transmission process should not be performed. If the communication environment is very inappropriate, packet loss is likely to occur. This is because when packet loss occurs, at the slow starting, the increased size of the congestion window is reduced in order to prevent another packet loss. Thus, for example, a communication condition for the transmission of data having a small data size is prepared, and the data is transmitted only when this communication condition is satisfied. This communication condition is made into a condition lenient than a communication condition for normal data transmission. For example, when the communication condition for normal data transmission is −40 dBm or more (refer to FIG. 8), it is conceivable to make the communication condition for the transmission of data having a small data size a more lenient value like −70 dBm or more. Alternatively, if communication condition for normal data transmission requires a plurality of condition items to be satisfied, it is conceivable to make the communication condition for the transmission of data having the small data size satisfy some of the plurality of condition items. The communication condition for normal data communication and the communication condition for communication of data having a small data size are, as an example, conditions that characterizes a state where the loss, error, or congestion of information in data communication is difficult to occur, and the communication condition for normal data communication is a condition that requires the state to be more difficult to occur than communication condition for communication of data having a small data size (a stricter condition). Note that it is assumed that the communication condition for communication of data having a small data size is required to make the state more difficult to occur than the above-mentioned communication condition for connection establishment (a stricter condition). In such a manner, by transmitting data having a small data size only if a required communication condition is satisfied, it is possible to prevent the precedent transmission process from being performed in a very inappropriate communication environment where packet loss is prone to occur.

Figure 15:
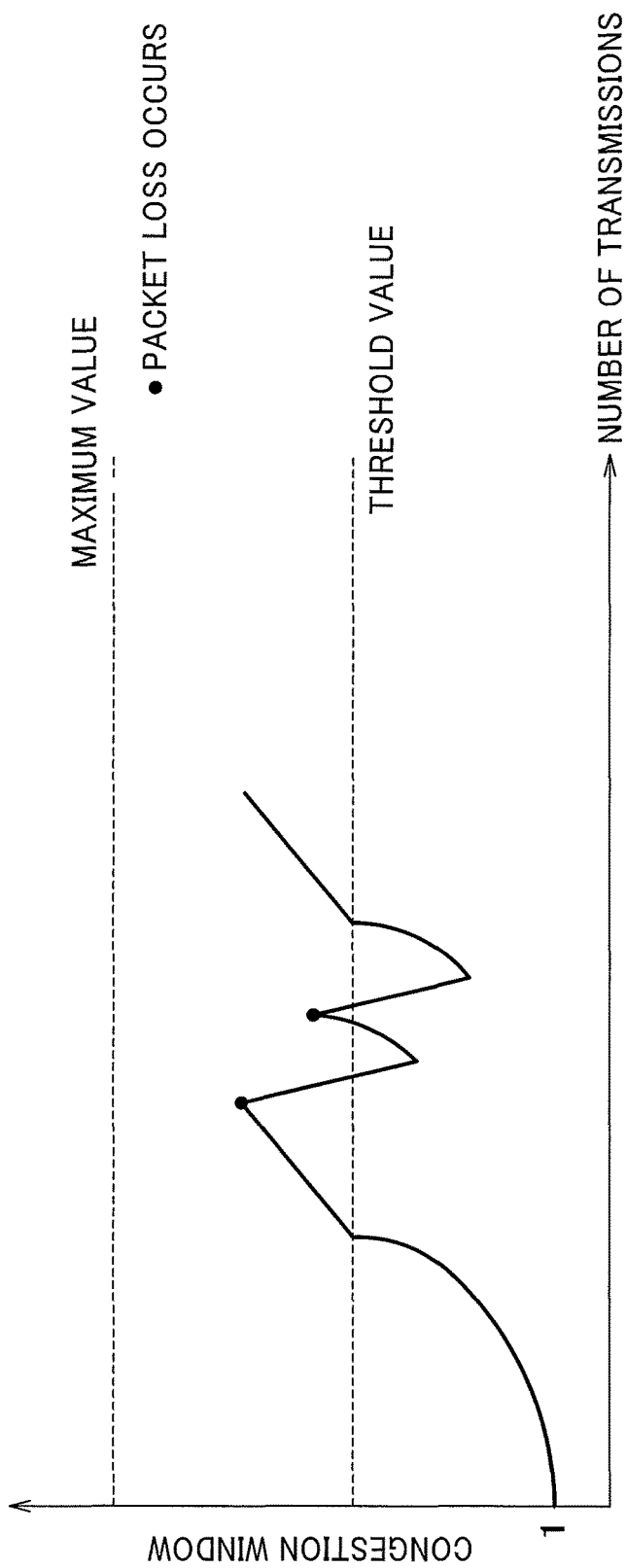
FIG. 15 is a relationship diagram between the number of transmissions and the size of a congestion window in the case congestion occurs.

FIG. 15 shows a relationship diagram between the number of transmissions and the size of a congestion window in the case packet loss occurs. As shown in FIG. 15, whenever packet loss occurs, the size of the congestion window is reduced and comes not to contribute to shortening a time period taken to communicate data having a large volume.

Figure 16:
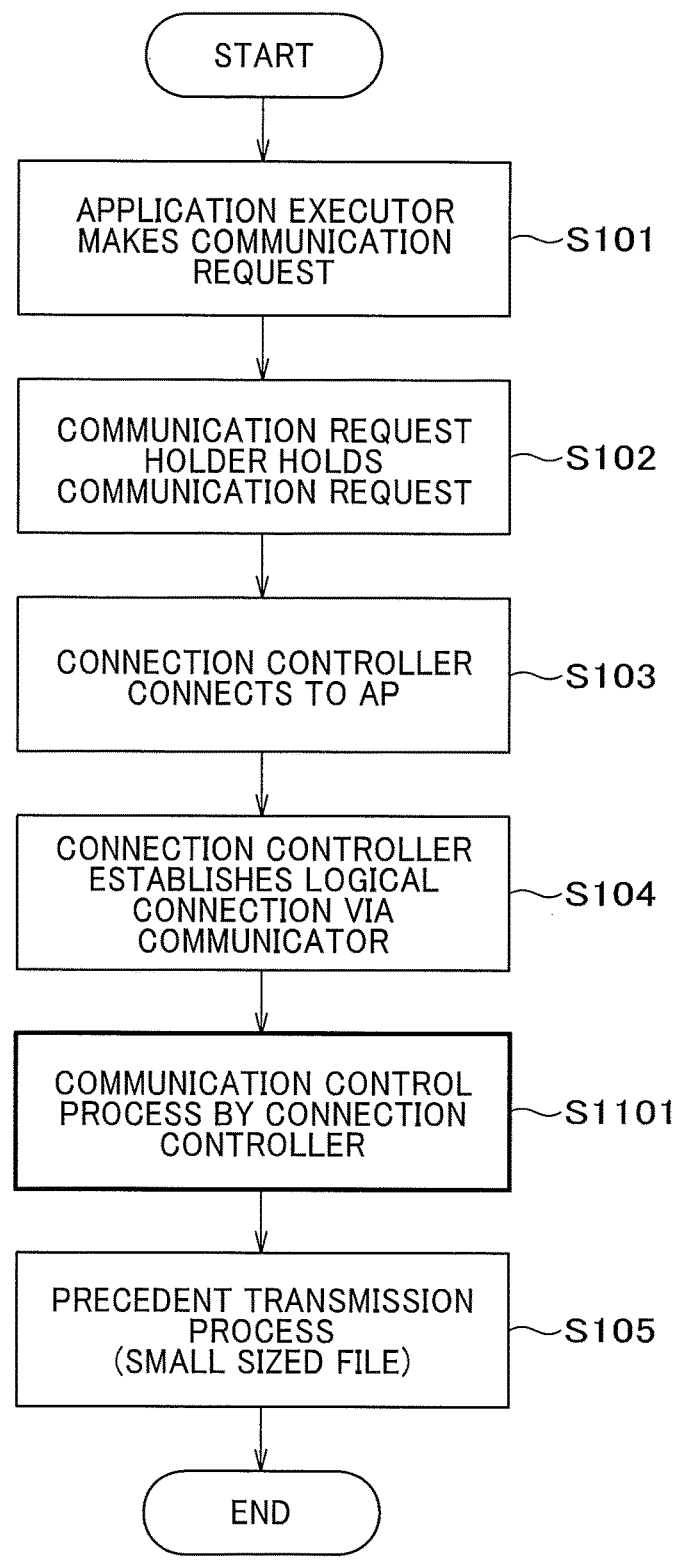
FIG. 16 is a flow chart in which a precedent transmission process is added to the communication start process in FIG. 3.

FIG. 16 shows a flow chart of a communication start process in a second embodiment. The flow of the communication start process in the present embodiment is a flow in which a precedent transmission process (S1101) is inserted subsequent to the connection establishment process (S104) in the flow of the communication start process in the first embodiment described above.

Figure 17:
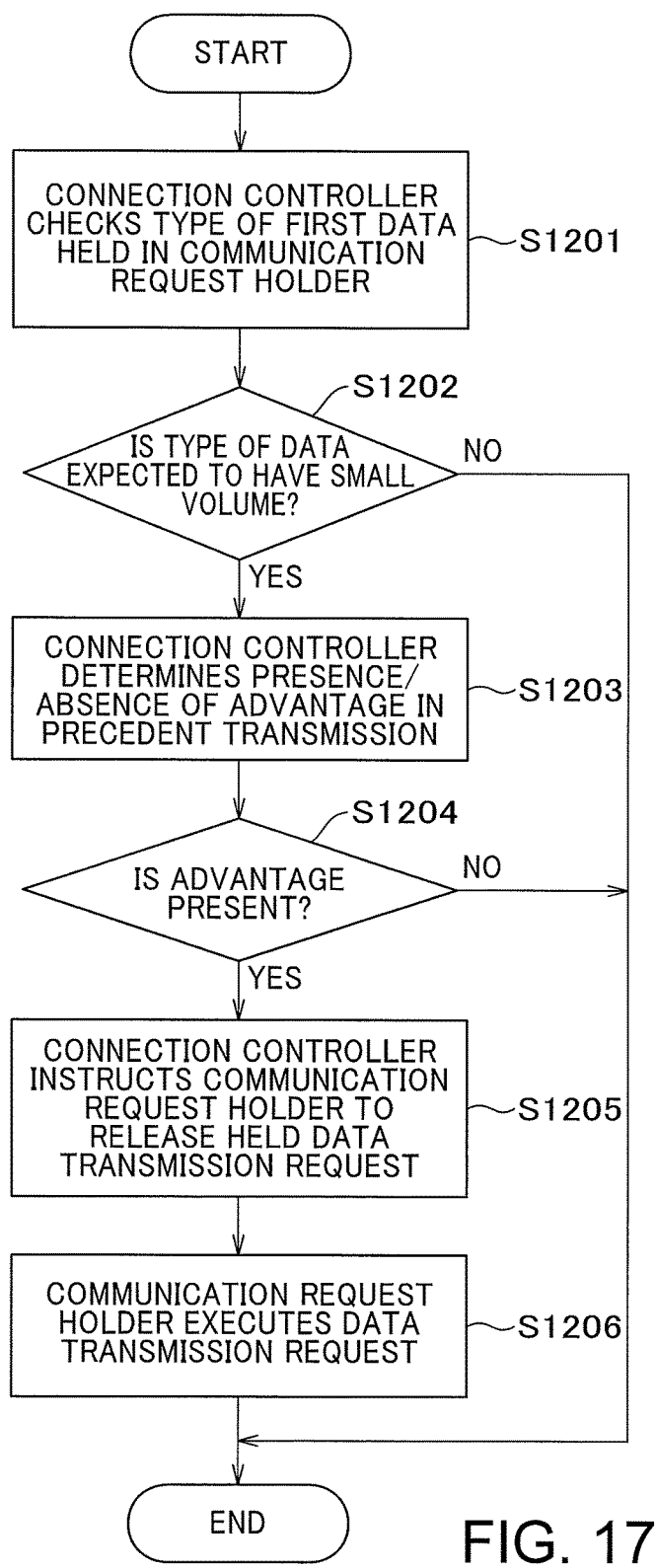
FIG. 17 is a flow chart of a precedent transmission process.

FIG. 17 shows a flow chart of the precedent transmission process (S1101). The connection controller 203 checks data type that a destination device transmits as a response to a request relating to the first process held in the communication request holder 202 (S1201). A checking method may be to analyze a request held in the communication request holder 202. For example, when an HTTP Request containing an HTTP header is contained in the request, it can be checked that required information is text (e.g., an HTML file) by analyzing the HTTP Request. Alternatively, an application that calls the request is identified, and if requested information type can be identified based on the application, the data type may be checked based on the application. The check may be performed by other methods. Note that an object to be processed is here the first request held in the communication request holder 202, but in the case where the communication request holder 202 can hold a plurality of requests and can refer to the details of each request, each request may be referred to and individually processed.

If the data type is not a type for which the volume of data is expected to be small like a text file such as an HTML (Hyper Text Markup Language) (NO in S1202), the connection controller 203 finishes this process, and the flow shifts to the communication control process (S105) in the communication start process. In the case of such a data type for which the volume of data is expected to be small (YES in S1202), the connection controller 203 determines whether precedent transmission has an advantage (S1203). Note that, the data type may be stored in the storage 204 or may be held in the connection controller 203. Here, the determination about the precedent transmission is made based on the data type, but if the size of the data is actually acquired and the size is smaller than or equal to a threshold value, the flow may be similarly proceeds to step S1203 determining that the volume of response data is small. It is conceivable to, for example, actually inquire a server to acquire the size of the data.

The determination of the presence/absence of the advantage can be made based on the communication environment and whether the checking process of a request described some time ago can reuse a TCP connection. Some HTTP versions allow a plurality of requests to be sent out using one TCP connection, while others allow only one request to be sent out using one TCP connection. The former case is equivalent to the case where one TCP connection can be reused. However, the determination may be made by other methods. In addition, the precedent transmission may be always performed by determining that the precedent transmission always has an advantage or by omitting the determination process.

If the communication environment is very inappropriate, packet loss is likely to occur, and thus the precedent transmission is not performed. The determination of the communication environment may be made by, as with the processes in the above-described embodiment, the connection controller 203 based on information such as SNR and SINR detected by the communication environment monitor 205.

In addition, in the case of a communications protocol under which one logical connection cannot be reused, even when data having a small data size is being transmitted earlier, a new logical connection needs to be established at the time of transmitting other data, and the slow starting cannot be avoided. Thus, there is no need to perform the precedent transmission process.

As described above, the connection controller 203 checks a communication environment and a protocol to be used and determines whether precedent transmission has an advantage (S1203). If it is determined that the precedent transmission has no advantage (NO in S1204), the precedent transmission is not performed. If it is determined that the precedent transmission has an advantage (YES in S1204), the connection controller 203 instructs the communication request holder 202 to execute a held request (data transmission request) (S1205). The communication request holder 202 receiving the instruction executes the request (S1206).

Through the above process, while preventing packet loss from occurring, data transmission (e.g., an HTTP request) can be started after increasing the size of a congestion window that is reduced due to slow starting, and it is possible to receive a large quantity of data (e.g., video data) in an actual transmission time as short as possible.

Third Embodiment

Figure 18:
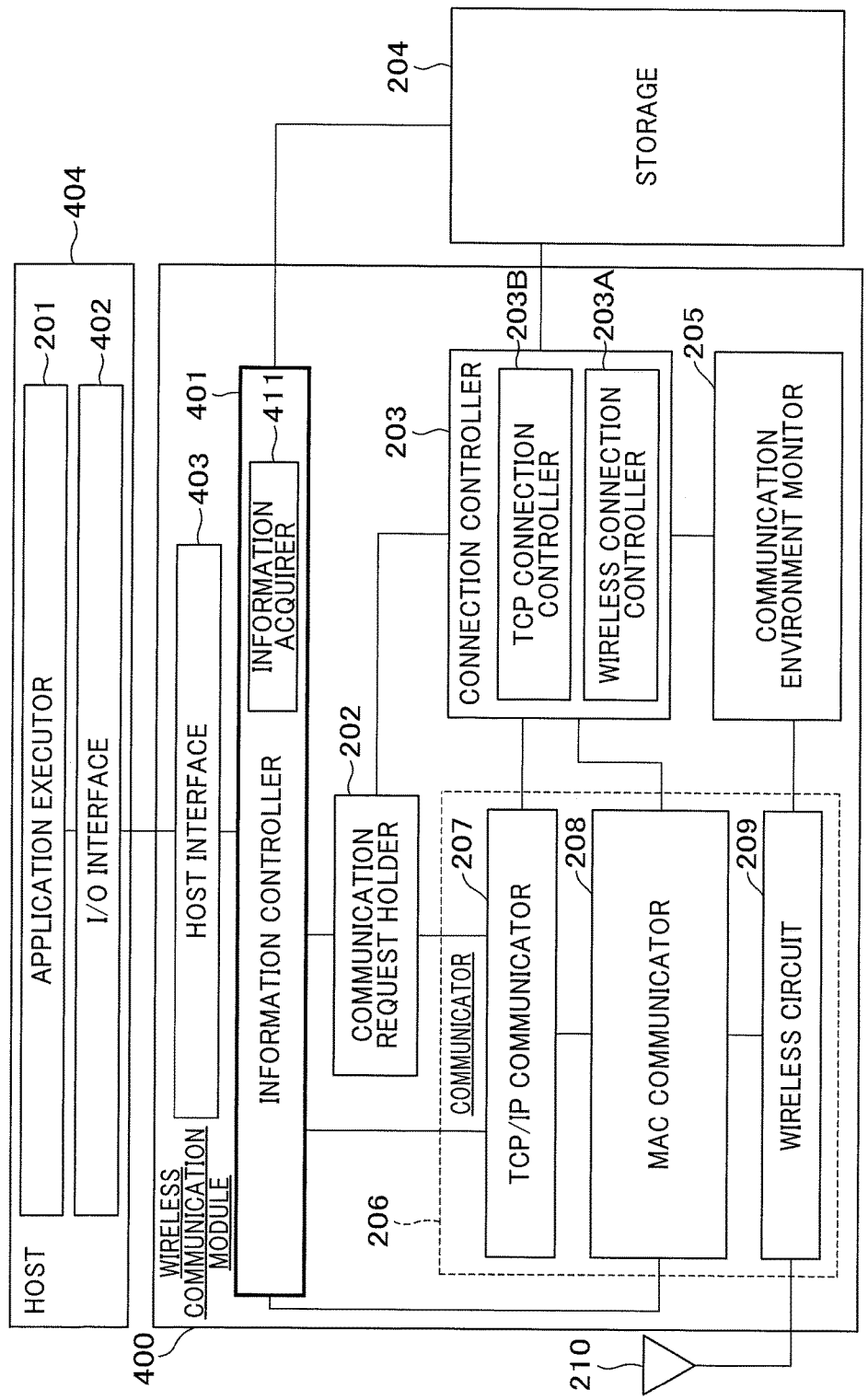
FIG. 18 is a block diagram of a communication device in a third embodiment.

Next, a third embodiment will be described. FIG. 18 shows a communication device in the third embodiment.

The communication device in the present embodiment includes a host 404 on which an application runs, and a wireless communication module 400. The host 404 and the wireless communication module 400 are formed, for example, in separate chips (integrated circuits). The I/O interface 402 is an I/O interface to connect to the host interface 403 of the wireless communication module 400. These interfaces are assumed to be, for example, various kinds of I/O interfaces such as a PCI Express (R), USB, and SDIO. In addition, the host 404 may include a specific storage (e.g., a RAM or disk device). A procedure executed between the host interface 403 and the I/O interface 402 and information exchanged therebetween follows individual interface specifications. The wireless communication module 400 may be formed as a communication card or a network card.

In addition, in the present embodiment, an information controller 401 including an information acquirer 411 is added to the above-mentioned embodiments. The information controller 401 is installed in the wireless communication module 400. In the preceding embodiments, the communication request holder 202 receives a request from the application executor 201, determines whether the request is a communication request that requires connection establishment and transmission, holds the request if it requires connection establishment and transmission, and outputs the request to the TCP/IP communicator 207 or the like if it is a request of other kinds.

Alternatively, the application executor 201 outputs only communication requests that require connection establishment and transmission to the communication request holder 202, and outputs the others to the TCP/IP communicator 207. The request for the connection establishment is executed after an AP is connected, and the request of the transmission is executed after a communication environment is improved.

In contrast, in the present embodiment, exchange with the application executor 201 is performed via the information controller 401. The information acquirer 411 is a part that performs an information acquiring process in response to a transmission request from an application. By analyzing a request from the application executor 201, searching the storage 204 for data requested by the request, and if the requested data (e.g., data intended to be acquired from a destination device using a HTTP request) is detected, by transmitting the desired data from the storage 204 as a response without communication with the destination device, it is possible to shorten a response time to the application. If there is no requested data, a communication request is transmitted to the communication request holder 202. The information controller 401 may output only a connection establishing request and a data transmission request to the communication request holder 202 and may directly output other requests to the TCP/IP communicator 207 or the MAC communicator 208.

In addition, the information acquirer 411 is also a part that performs an information receiving process at the time of receiving data transmitted from the destination device and saves the data in the storage 204. Furthermore, the information acquirer 411 also autonomously acquires information relating to the acquired data (accompanying information) without receiving a request from the application executor (this may also be referred to as precedent acquisition or prefetch) and saves the information in the storage 204. Conceivable accompanying information is data to which the acquired data refers to using data location information such as URL, but accompanying information may be acquired by the information acquirer 411 making specific determination in such a manner as to analyze the contents of the data to specify information that needs to be acquired and acquiring the specified information as the accompanying information. In addition, the accompanying information may be individually acquired by the information acquirer 411 periodically or unperiodically using the storage 204 not in response to the reception of a request from the application executor.

Note that, to the storage 204, a database or the like that is suitable for search is added, in addition to a part where data for judging the conditions of the communication environment described in the first embodiment is stored, and information obtained by precedent acquisition (prefetch) may be saved in the database.

In such a manner, the information controller 401 exchanges requests, data, or the like with the application executor 201 in a collective manner, which allows a communication device to be formed in the form of the host 404 including the application executor 201, and one wireless communication module 400 that is separated from the host 404.

Figure 19:
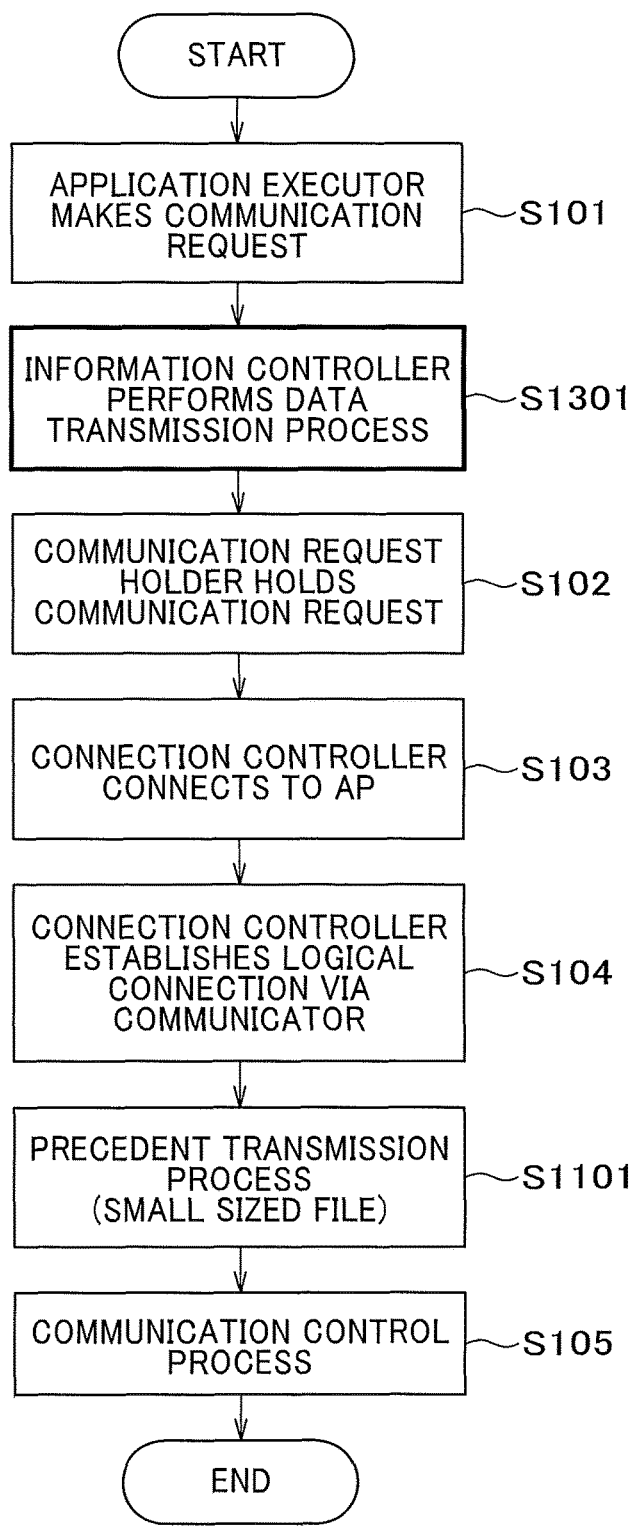
FIG. 19 is a flow chart in which a transmission process by an information controller is added to the communication start process in FIG. 16.

FIG. 19 shows a flow chart of a communication start process in the present embodiment.

The flow of the communication start process in the present embodiment is a flow in which a data transmission process by the information controller 401 (S1301) is added subsequent to issuing a request relating to communication by the application executor 201 (S101) in the flow of the communication start process in the embodiments described above. Other processes are the same as those in the one embodiment described above.

Figure 20:
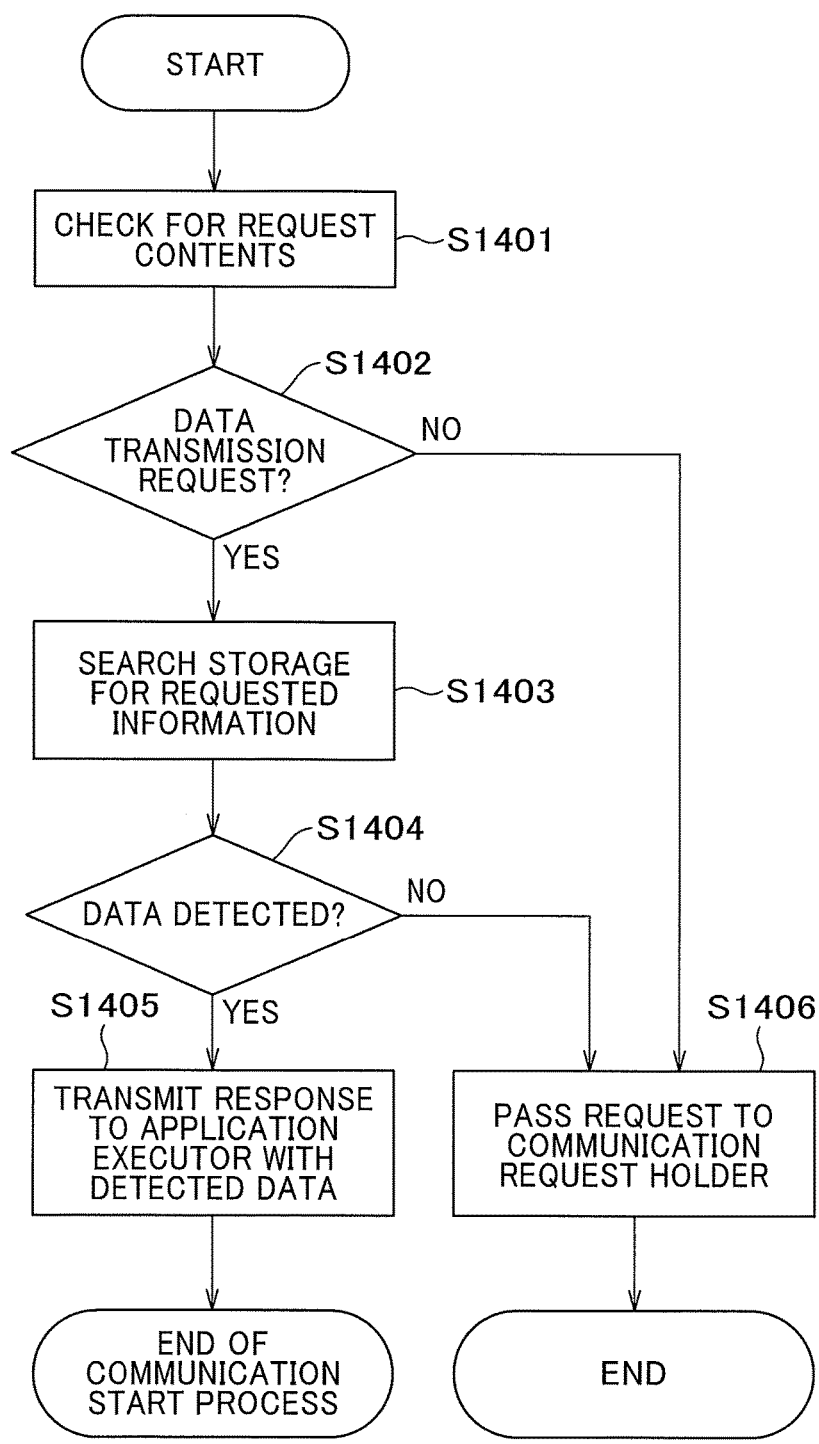
FIG. 20 is a detailed flow chart of the transmission process by the information controller.

FIG. 20 shows a flow chart of the data transmission process by the information controller 401.

The information controller 401 receives a request from the application executor 201 and checks whether the request is a data transmission request (e.g., an HTTP request) (S1401). In the case of a data transmission request (YES in S1402), the information acquirer 411 searches the storage 204 for requested information (e.g., information that is desired, using an HTTP request, to be transmitted as a response from a destination device) (S1403). If the requested information can be detected (YES in S1404), the detected data is passed to the application executor 201 (S1405). This finishes not only the transmission process by the information receiving unit but also the communication start process. If the requested information cannot be detected (NO in S1404), the request is passed to the communication request holder 202 (S1406), and this process is finished. By passing the request to the communication request holder 202, the collection of information is thereafter performed on the destination device in accordance with the flow subsequent to step S102 of the communication start process shown in FIG. 19.

If the request from the application executor 201 is not a data transmission request (NO in S1402), the information controller 401 passes the request to the communication request holder 202 (S1406), and this process is finished. Requests not being a data transmission request include a connection establishing request or requests of other kinds, which are subjected to respective corresponding processes through the process by the communication request holder 202 (S102) shown in FIG. 19. Note that only a connection establishing request and a data transmission request may be output to the communication request holder 202, and the other requests may be directly output to the TCP/IP communicator 207 or the MAC communicator 208.

Figure 21:
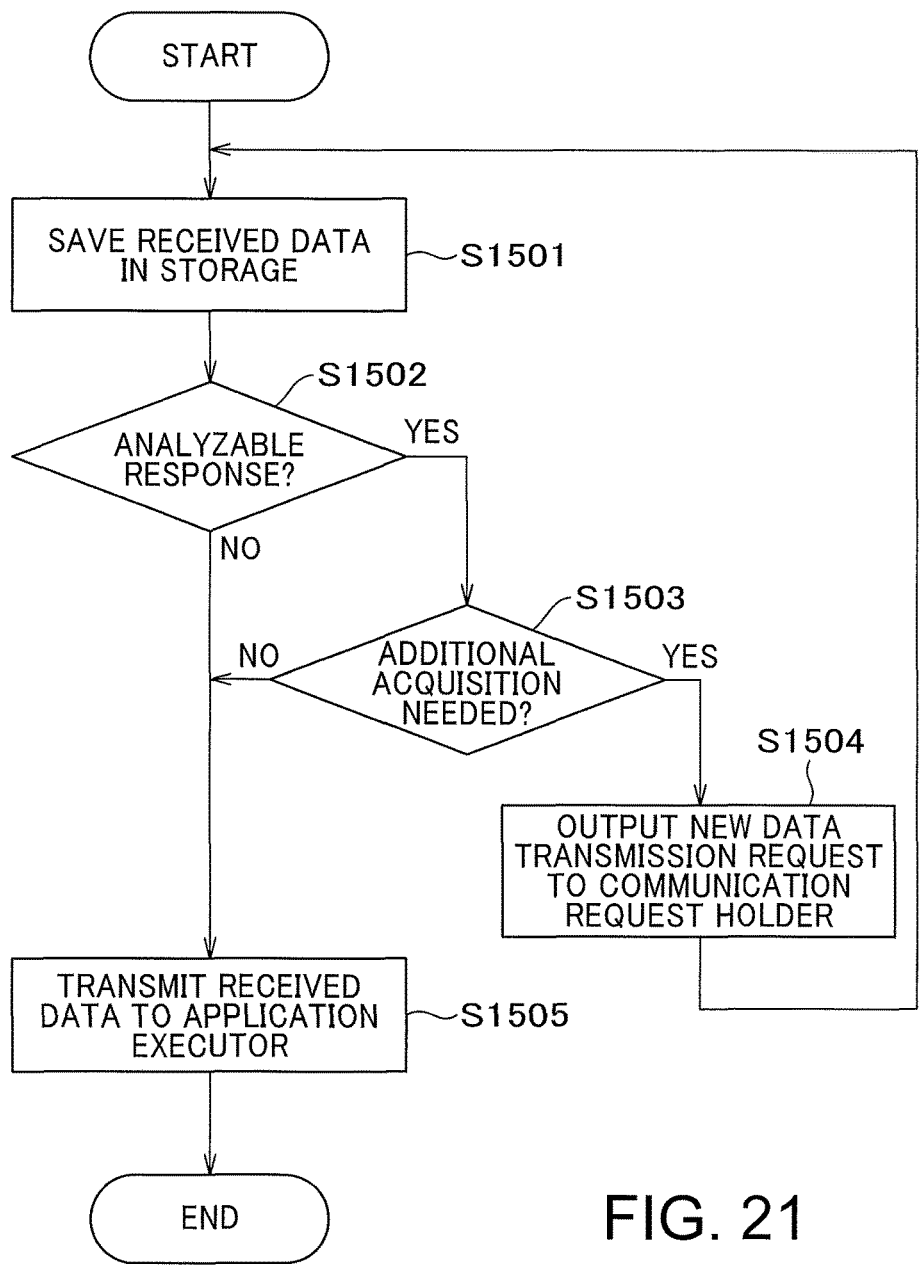
FIG. 21 is a flow chart of a receiving process by the information controller.

FIG. 21 shows a flow chart of a data receiving process by the information controller 401 performed when data is received from a destination device.

The information acquirer 411 of the information controller 401 receives response data from the destination device and saves the data in the storage 204 (S1501). Then, if the data is analyzable (YES in S1502) and additional acquisition is needed (YES in S1503), the information acquirer 411 issues new communication requests (a connection establishing request and a data transmission request) to acquire accompanying information and passes the accompanying information to the communication request holder 202 (S1504). Conceivable analyzable data is an HTML, a text file or the like. A conceivable case where the additional acquisition is needed is the case where, for example, an 25. HTML file refers to accompanying information such as image data using a URL or the like. In addition, the accompanying information may be the next HTML file linked from the HTML file.

To acquire information being a link destination, it is required to determine a limit on the number of tracked links. This limit may be determined based on a communication time period assumed until the link destination is acquired, the power source type of the communication device (battery, AC adapter (commercial power)), the charging state of the power source, a predetermined threshold value, and the like, or by other methods. In addition, the URL of the first data receiving request destination may be transmitted to a searching server or a search history evaluating server to cause the server to specify other information relating to information to be acquired, and a list for the information may be contained in accompanying information.

If the data from the destination device is unanalyzable (NO in S1502) or additional acquisition is not needed (NO in S1503), the information acquirer 411 transmits information requested by the application executor 201 to the application executor 201 (S1505). Note that the requested information and the accompanying information acquired thus far may be returned to the application executor 201.

It is assumed here that the response transmitted to the application executor 201 is made after all pieces of accompanying information are acquired, but the response may be made to the application executor 201 at the time of acquire the information required from the application executor 201. That is, the response data may be passed to the application executor 201 prior to the acquisition of the accompanying information.

In such a manner, in the present embodiment, it is possible to make a response with data stored in the storage 204 without waiting for a communication environment to be improved. In addition, the acquisition of accompanying information in an appropriate communication environment may allow data required by an application to be acquired even when the communication environment deteriorates and the communication is interrupted.

In addition, in the present embodiment, only the information controller 401 is connected to the application executor 201, and if data to be transmitted as a response is stored in the storage 204, only the information controller 401 and the storage 204 operate, and the communicator 206, the communication request holder 202, the connection controller 203, and the communication environment monitor 205 do not need to operate. Therefore, consumed energy can be reduced by bringing the components other than the information controller 401 and the storage 204 into a low-power-consuming state in a normal time, such as bringing them into a power off state or reducing the operating frequencies thereof. Therefore, further power saving can be achieved by adding a power control function.

It is assumed that the power source control is not performed on the information controller 401 because the information controller 401 receives requests from the application executor 201. The power control function may cause the storage 204 to shift to an operating state when a data transmission request is notified. Then, if there is no data in the storage 204, all the components may be caused to shift to the operating state. In such a manner, energy saving is achieved as a whole.

In addition, when further power saving is desired, the information controller 401 may be divided into the application executor 201, a part that exchanges signals, and other parts, and the other parts may be activated after an instruction from the application executor is received.

Figure 22:
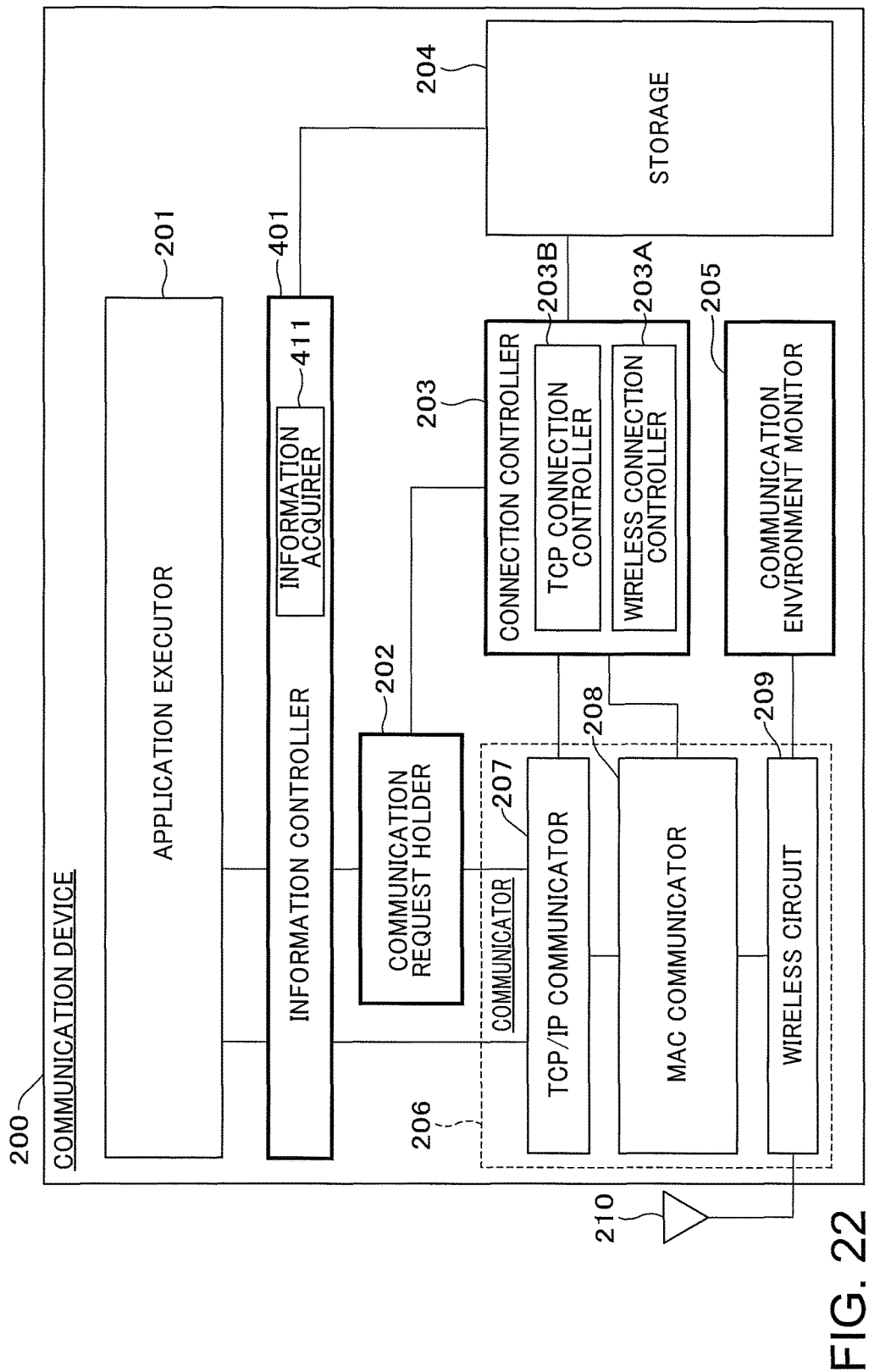
FIG. 22 is a block diagram of another example of the communication device in the third embodiment.

The present embodiment has been described about the example in which the information controller 401 including the information acquirer 411 is provided in a communication device having the form of the host and the wireless communication module, but the information controller 401 may also be provided in an integrated communication device that is not divided into the host and the wireless communication module as shown in FIG. 2. FIG. 22 shows a block diagram in this case. The operation thereof will not be described because it is obvious from the description of the present embodiment.

Figure 23:
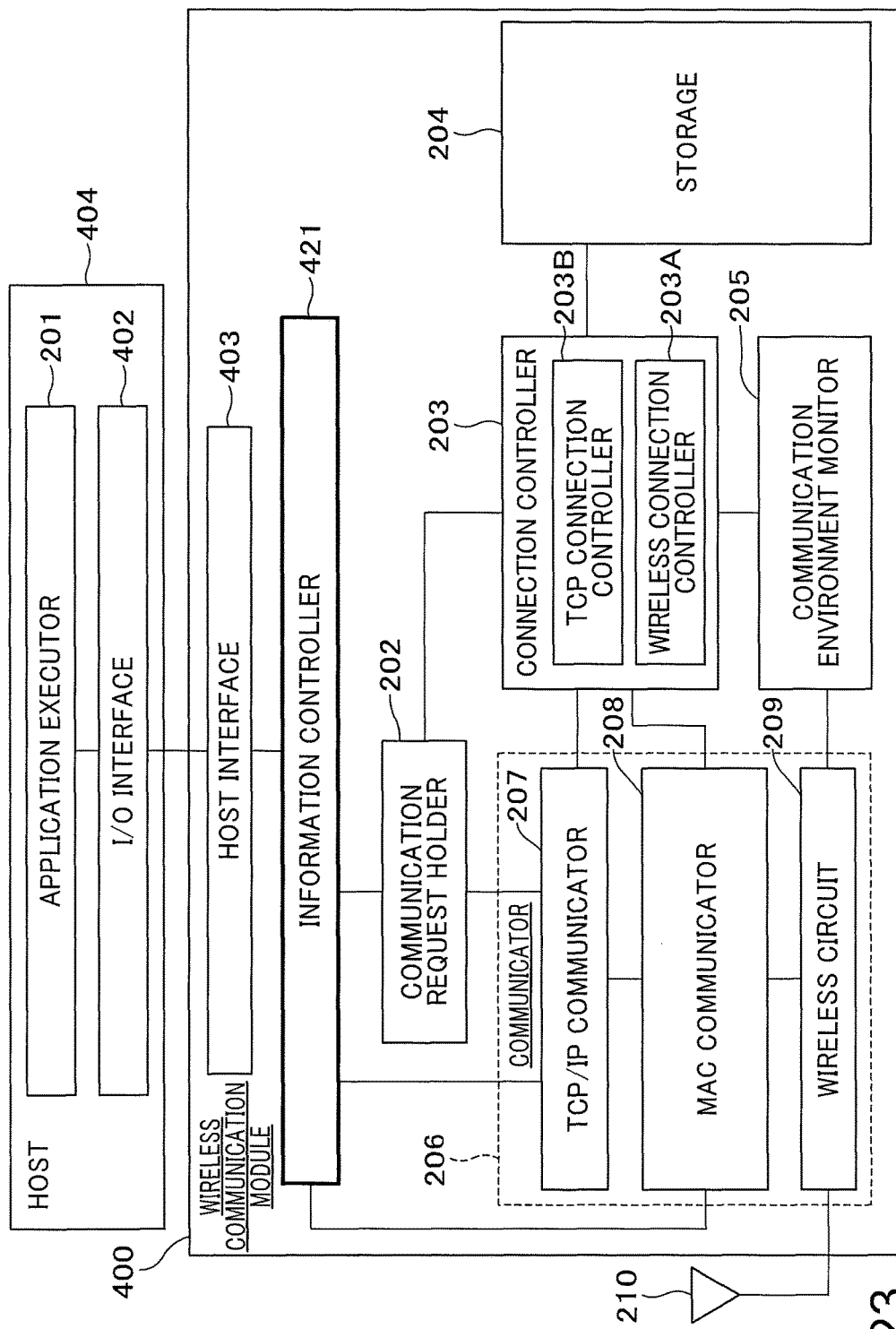
FIG. 23 is a block diagram of still another example of the communication device in the third embodiment.

In addition, in the present embodiment, the information controller 401 including the information acquirer 411 is provided in the communication device having the form of the host and the wireless communication module, but a configuration is possible where an information controller not including the information acquirer 411 is provided. That is, a configuration is also possible where hardware thereof is divided into a host and a wireless communication module while having the function basically similar to that of the communication device in FIG. 2. FIG. 23 shows a configuration example in this case. The information controller 421 operates similarly to the information controller 401 described thus far except for the eliminated function of the information acquirer 411. Note that, as to the power control function of this configuration, if the wireless LAN interface (the communication environment monitor 205, the MAC communicator 208, and the wireless circuit 209) are deactivated at the time of receiving a request from the host 404, the wireless LAN interface may be activated.

Note that, each of the processes in the embodiments described above can be implemented by software (a program). Therefore, the communication device and the wireless communication module in the embodiments described above can be implemented, for example, by using a general-purpose computer device as basic hardware and causing a processor installed in the computer device to execute a program.

Figure 24:
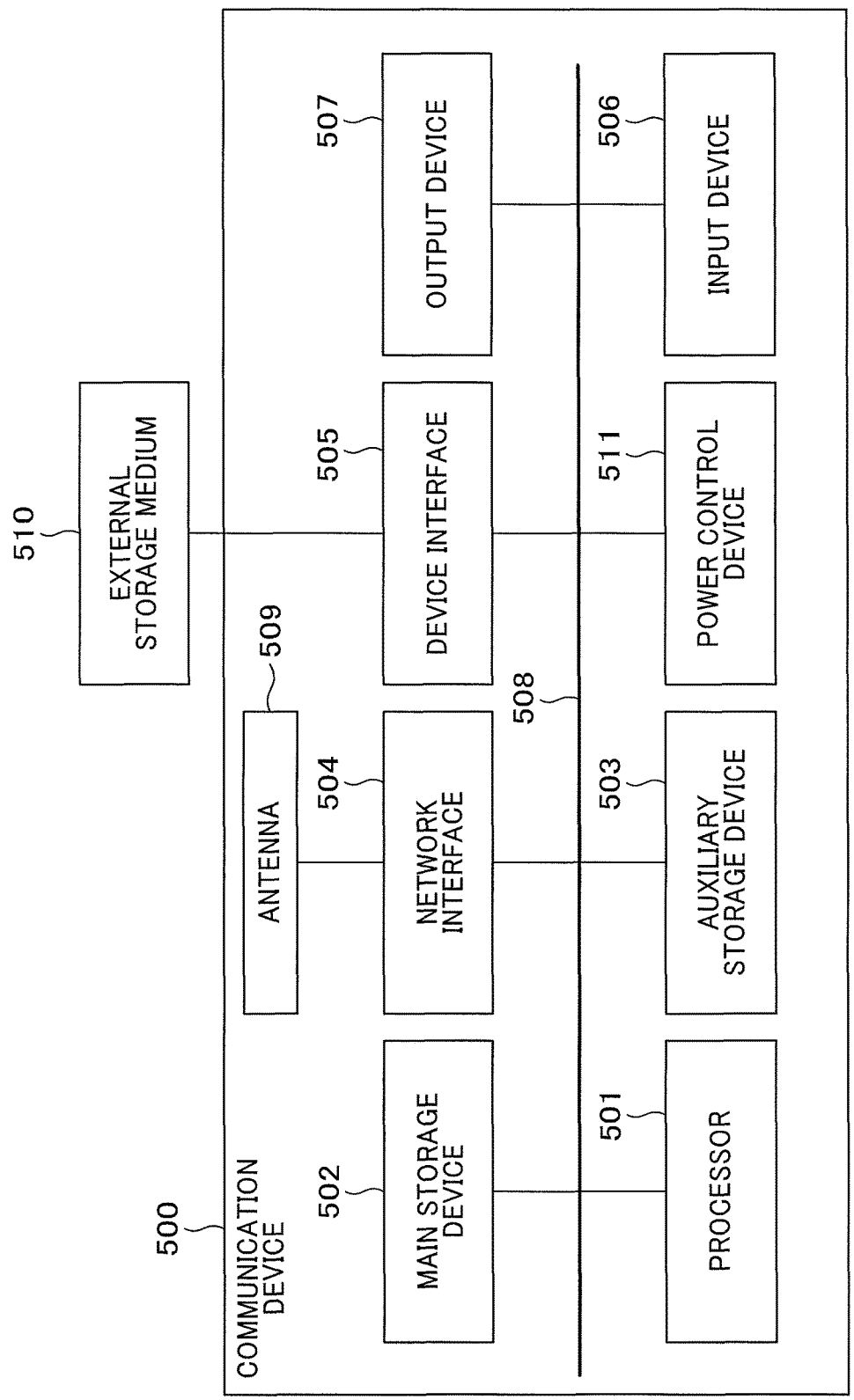
FIG. 24 is a hardware block diagram of the communication device in an embodiment.

FIG. 24 shows a hardware configuration example of a communication device in one embodiment.

A communication terminal can be provided as a computer device that includes a processor 501, a main storage device 502, an auxiliary storage device 503, a network interface 504, a device interface 505, an input device 506, an output device 507, and a power control device 511, which are connected to one another via a bus 508. Although the power control device 511 exists as an individual device, the function of power source control may be installed in the processor 501 or the network interface 504. The communication terminal shown in FIG. 24 may be referred to as a communication device.

The processor 501 reads out a program from the auxiliary storage device 503 expands the program onto the main storage device 502 and execute it, by which the functions of the application executor 201, the communication request holder 202, the connection controller 203, the TCP/IP communicator 207, and the information controller 401 can be implemented.

The communication device or the wireless communication module in the present embodiment may be implemented by installing programs running on the communication device or the wireless communication module in a computer device in advance, or may be implemented by storing the programs in a storage medium such as a CD-ROM or distributing the programs over a network and installing the programs in the computer device.

The network interface 504 is an interface to connect to a network via the antenna 509 and the like. The functions of the MAC communicator 208, the wireless circuit 209, and the communication environment monitor 205 can be implemented by this network interface.

In addition, the device interface 505 is an interface to connect to a device such as an external storage medium 510. In addition, if an application executing device is present outside the communication device, the device interface 505 may also be connected to the application executing device.

A user can input information via the input device 506. The input may be an instruction to an application. In addition, the output device 507 may be a display to display images or a communication device that transmits data to the outside (a communication interface different from the network interface 504). The display may display data in the main storage device 502 or the auxiliary storage device 503 as images. The external storage medium 510 may be any recording medium such as an HDD, CD-R, CD-RW, DVD-RAM, and DVD-R.

The main storage device 502 is a memory device to temporarily store commands executed by the processor 501, various kinds of data, and the like, which may be a volatile memory such as a DRAM, or a nonvolatile memory such as an MRAM.

The auxiliary storage device 503 is a storage device to permanently store a program, data, and the like, which is, for example, an HDD or SSD. The function of the storage 204 can be implemented with the main storage device 502, the auxiliary storage device 503, or the external storage medium 510.

The invention claimed is:

1. A communication device comprising:
first circuitry configured to establish a wireless connection with a first communication device, in accordance with a communication request relating to data communication;
second circuitry configured to measure a communication environment of the communication device to acquire communication environment data; and
third circuitry configured to establish a logical connection with a second communication device relating to the communication request via the wireless connection and perform control so as to perform the data communication with the second communication device in accordance with the communication environment data, wherein
the third circuitry is configured to determine whether a first communication condition is satisfied based on the communication environment data, establish the logical connection when the first communication condition is satisfied, and not establish the logical connection when the first communication condition is not satisfied, and the first communication condition defines tolerability against loss of information, error, or congestion in data communication.

2. The communication device according to claim 1, wherein
the third circuitry is configured to determine, based on the communication environment data, whether a second communication condition is satisfied, perform the data communication when determining that the second communication condition is satisfied, and not perform the data communication when determining that the second first communication condition is not satisfied, wherein
the second communication condition defines tolerability against loss of information, error, or congestion in data communication, and
the second communication condition requires higher tolerability than the first communication condition.

3. The communication device according to claim 1, further comprising:
fourth circuitry configured to manage an elapsed time from when the communication request is issued, wherein
when the data communication is not yet completed, the third circuitry is configured to keep or disconnect the logical connection in accordance with a measured elapsed time, and
when the logical connection is disconnected by the third circuitry, the first circuitry is configured to disconnect the wireless connection.

4. The communication device according to claim 1, wherein the first circuitry is configured to determine, based on communication with the first communication device in the wireless connection, whether there is a possibility of increase of a transmission rate of the wireless connection by reconnecting to the first communication device, and disconnect the wireless connection and reconnect to the first communication device when there is the possibility.

5. The communication device according to claim 1, wherein the third circuitry is configured to, when a plurality of communication requests employ same logical connection and any one of the communication requests requires a response with data having a size smaller than a threshold value or data of a predetermined type, perform the one communication request prior to other communication requests.

6. The communication device according to claim 5, wherein
when a third communication condition is satisfied, the third circuitry is configured to perform data communication based on the communication request that requires a response with the data having a size smaller than the threshold value or the data of the predetermined type, prior to other communication requests, and
the third communication condition defines tolerance of loss of information, error, or congestion in data communication.

7. The communication device according to claim 1, further comprising a host interface configured to receive the communication request issued by an application and transmit an execution response for the communication request.

8. The communication device according to claim 7, further comprising
fourth circuitry configured to determine whether a communication request received by the host interface is an establishment request for the logical connection or a transmission request for data using the logical connection, wherein
the first circuitry is configured to establish the wireless communication and the third circuitry is configured to establish the logical connection in a case in which the communication request received by the host interface is determined to be the establishment request for the logical connection or the transmission request for the data.

9. The communication device according to claim 1, further comprising:
fourth circuitry configured to analyze data acquired from the second communication device in accordance with the communication request and issue a communication request to acquire additional data, wherein
the first and third circuitry are configured to establish the wireless communication and establish the logical connection in accordance with the communication request issued by the fourth circuitry.

10. The communication device according to claim 9, wherein the fourth circuitry is configured to acquire data location information that is referred to from data acquired from the second communication device, and issue a communication request to acquire the additional data based on the data location information.

11. The communication device according to claim 9, wherein the fourth circuitry is configured to, when data items are acquired in accordance with communication requests issued recursively due to a first communication request, transmit a response including the data acquired in accordance with the first communication request to the application.

12. The communication device according to claim 9, further comprising:
a storage configured to store data acquired in accordance with the communication request issued by the fourth circuitry, wherein
the fourth circuitry is configured to check whether data requested by the communication request from an application exists in the storage, and in a case in which the data exists in the storage, the fourth circuitry is configured to read out the data in the storage and transmit the data to the application, and the third circuitry is configured to not establish the logical connection in accordance with the communication request.

13. The communication device according to claim 1, further comprising:
an input interface configured to receive input from a user;
fourth circuitry configured to execute an application in accordance with an instruction input from the input interface;
a storage configured to store data acquired from the second communication device and data to be transmitted to the second communication device; and
a display configured to display the data stored in the storage.

14. The communication device according to claim 1, wherein the first communication device is a relay device, and the second communication device is the relay device or a communication device different from the relay device.

15. A communication control method performed by a computer, the method comprising:
establishing a wireless connection with a first communication device, in accordance with a communication request relating to data communication;

measuring a communication environment of the communication device to acquire communication environment data; and establishing a logical connection with a second communication device relating to the communication request via the wireless connection and controlling so as to perform the data communication with the second communication device in accordance with the communication environment data, wherein in the establishing the logical connection, by determining whether a first communication condition is satisfied based on the communication environment data, the logical connection is established when the first communication condition is satisfied, and is not established the logical connection when the first communication condition is not satisfied, and the first communication condition defines tolerability against loss of information, error, or congestion in data communication.

16. A non-transitory computer readable medium having a computer program stored therein which, when executed, causes a computer to perform processes comprising:

establishing a wireless connection with a first communication device, in accordance with a communication request relating to data communication;

measuring a communication environment of the communication device to acquire communication environment data; and establishing a logical connection with a second communication device relating to the communication request via the wireless connection, and controlling so as to perform the data communication with the second communication device in accordance with the communication environment data, wherein in the establishing the logical connection, by determining whether a first communication condition is satisfied based on the communication environment data, the logical connection is established when the first communication condition is satisfied, and is not established the logical connection when the first communication condition is not satisfied, and the first communication condition defines tolerability against loss of information, error, or congestion in data communication.

\* \* \* \* \*